(12) United States Patent
Take

(10) Patent No.: US 7,907,354 B2
(45) Date of Patent: Mar. 15, 2011

(54) ZOOM LENS, OPTICAL APPARATUS EQUIPPED WITH THE ZOOM LENS AND METHOD FOR FORMING AN IMAGE OF AN OBJECT AND VARYING A FOCAL LENGTH

(75) Inventor: Toshinori Take, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/256,471

(22) Filed: Oct. 22, 2008

(65) Prior Publication Data

US 2009/0116121 A1 May 7, 2009

(30) Foreign Application Priority Data

Nov. 2, 2007 (JP) ................ P2007-285761

(51) Int. Cl.
*G02B 9/34* (2006.01)
(52) U.S. Cl. .................... 359/774; 359/772
(58) Field of Classification Search .......... 359/684, 359/686, 687, 758, 760, 769
See application file for complete search history.

(56) References Cited

U.S. PATENT DOCUMENTS

| 5,798,872 | A * | 8/1998 | Uzawa ............. 359/686 |
| 7,136,231 | B2 * | 11/2006 | Ito et al. ........... 359/687 |
| 7,251,081 | B2 * | 7/2007 | Sato ............... 359/676 |
| 7,583,450 | B2 * | 9/2009 | Ishii ............... 359/687 |
| 2007/0014032 | A1 * | 1/2007 | Otake ............. 359/692 |

FOREIGN PATENT DOCUMENTS

JP  2007-003554  1/2007

* cited by examiner

Primary Examiner — Timothy J Thompson
(74) Attorney, Agent, or Firm — Miles & Stockbridge P.C.

(57) ABSTRACT

A zoom lens comprises the following lens groups in the order from an object side: a first lens group having a positive refracting power; a second lens group having a negative refracting power; a third lens group having a positive refracting power; and a fourth lens group having a positive refracting power; wherein, upon zooming, at least the first lens group and the fourth lens group move to the object side; and wherein the third lens group comprises a negative meniscus lens with a convex surface on an image side and with both side faces thereof being exposed to air, which is located nearest to the image side.

22 Claims, 15 Drawing Sheets

ZOOM LENS, OPTICAL APPARATUS EQUIPPED WITH THE ZOOM LENS AND METHOD FOR FORMING AN IMAGE OF AN OBJECT AND VARYING A FOCAL LENGTH

BACKGROUND OF THE INVENTION

1. Field of the Invention

The present invention relates to a zoom lens.

2. Related Background Art

There is a conventionally known zoom lens of a positive, negative, positive, positive, and positive 5-group type. This zoom lens of the positive, negative, positive, positive, and positive 5-group type is composed of the following five lens groups arranged in the order from the object side: a first lens group having a positive refracting power; a second lens group having a negative refracting power; a third lens group having a positive refracting power; a fourth lens group having a positive refracting power; and a fifth lens group having a positive refracting power, and is configured so that, with a change in a lens position state from a wide-angle end state (a state in which the focal length is the shortest) to a telephoto end state (a state in which the focal length is the longest), at least the first lens group and the third lens group move to the object side (e.g., cf. Japanese Patent Application Laid-open No. 2007-003554).

SUMMARY OF THE INVENTION

Nowadays, light receiving elements are highly integrated in digital still cameras, camcorders, etc. using solid-state image sensors or the like; with recent increase in integration degree thereof, the area of each light receiving element became narrower; therefore, the optical system became required to have high optical performance as well as a larger aperture. In addition, there are needs for digital still cameras and others with a high zoom ratio, in a compact size and with excellent portability because of convenience of photography. However, the light receiving elements in the increased number of pixels raised the problem that the conventional lens systems failed to provide optical performance compatible with a wider light reception area and the problem that the lens system tended to become larger in order to achieve a lager aperture. As the lens system became larger, the whole camera also became larger, to cause inconvenience in portability. There are also increasing demands for a zoom lens with a wide angle of view, in order to expand a possibility of photographer's photographic expressions. When a wider angle of view is available, a photographer can enjoy photography with higher degrees of freedom. It is, however, extremely difficult to achieve a high zoom ratio and a wide angle of view together with high image quality, and, even if possible, there arose another issue of increase in the size of the optical system.

An embodiment of the present invention has been accomplished in view of the above-described problems and an object of an embodiment of the present invention is to provide a zoom lens capable of achieving high imaging performance while having a wide angle of view and a high zoom ratio, and an optical apparatus equipped with this zoom lens.

For purposes of summarizing an embodiment of the invention, certain aspects, advantages, and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessary achieving other advantages as may be taught or suggested herein.

In order to accomplish the above object, a zoom lens according to an embodiment of the present invention comprises the following lens groups in the order from the object side: a first lens group having a positive refracting power; a second lens group having a negative refracting power; a third lens group having a positive refracting power; and a fourth lens group having a positive refracting power; and is configured so that, upon zooming, at least the first lens group and the fourth lens group move to the object side and so that the third lens group comprises a negative meniscus lens with a convex surface on the image side and with the both side faces thereof being exposed to air, which is located nearest to the image side.

In the zoom lens according to an embodiment of the present invention, the negative meniscus lens may be a single lens.

In the zoom lens according to an embodiment of the present invention, the third lens group may further comprise the following lenses arranged on the object side of the negative meniscus lens and in the order from the object side: a positive lens with a convex surface on the object side; and a cemented lens consisting of a positive lens with a convex surface on the object side and a negative lens with a concave surface on the image side.

In the zoom lens according to an embodiment of the present invention, upon zooming, at least the first lens group and the fourth lens group may move to the object side to vary a space between the first lens group and the second lens group, vary a space between the second lens group and the third lens group, and vary a space between the third lens group and the fourth lens group.

In the zoom lens according to an embodiment of the present invention, upon zooming, the lens groups may be configured to increase the space between the first lens group and the second lens group, decrease the space between the second lens group and the third lens group, and decrease the space between the third lens group and the fourth lens group.

The zoom lens according to an embodiment of the present invention may further comprise an aperture stop between the second lens group and the third lens group, and the aperture stop may be configured to move together with the third lens group upon zooming.

In the zoom lens according to an embodiment of the present invention, the cemented lens consisting of the positive lens with the convex surface on the object side and the negative lens with the concave surface on the image side in the third lens group may be a cemented lens having a negative refracting power.

In the zoom lens according to an embodiment of the present invention, at least one surface in the third lens group may be an aspherical surface.

The zoom lens according to an embodiment of the present invention may satisfy the condition of the following relation:

$$1.30 < f3/f4 < 1.85,$$

where f3 is a focal length of the third lens group and f4 is a focal length of the fourth lens group.

The zoom lens according to an embodiment of the present invention may further comprise a fifth lens group having a positive refracting power on the image side of the fourth lens group.

In the zoom lens of an embodiment of the present invention in this configuration, the fifth lens group may be stationary with respect to an image plane upon zooming.

In the zoom lens according to an embodiment of the present invention, the fifth lens group may be moved to the object side to adjust focus to a close object.

The zoom lens according to an embodiment of the present invention may satisfy the condition of the following relation:

$$4.7 < f5/fw < 15.1,$$

where fw is a focal length of the entire lens system in the wide-angle end state and f5 is a focal length of the fifth lens group.

In the zoom lens according to an embodiment of the present invention, the fifth lens group may be composed of a single lens component.

In the zoom lens of an embodiment of the present invention in this configuration, the fifth lens group may be composed of a cemented lens consisting of a positive lens and a negative lens.

Furthermore, the zoom lens according to an embodiment of the present invention may satisfy the condition of the following relation:

$$0.19 < f3/f5 < 0.56,$$

where f3 is a focal length of the third lens group and f5 is a focal length of the fifth lens group.

A method forming an image of an object and varying a focal length, according to an embodiment of the present invention, comprises the steps of: providing a zoom lens that includes the following lens groups in the order from the object side, a first lens group having a positive refracting power, a second lens group having a negative refracting power, a third lens group having a positive refracting power, and a fourth lens group having a positive refracting power, the third lens group comprising a negative meniscus lens with a convex surface on an image side and with the both side faces thereof being exposed to air, which is located nearest to the image side; and moving at least the first lens group and the fourth lens group to the object side, upon zooming.

In the method according to an embodiment of the present invention, the third lens group further may comprise the following lenses arranged on the object side of the negative meniscus lens and in the order from the object side: a positive lens with a convex surface on the object side; and a cemented lens consisting of a positive lens with a convex surface on the object side and a negative lens with a concave surface on the image side.

In the method according to an embodiment of the present invention, the cemented lens consisting of the positive lens with the convex surface on the object side and the negative lens with the concave surface on the image side in the third lens group may be a cemented lens having a negative refracting power.

The method according to an embodiment of the present invention may satisfy the condition of the following relation:

$$1.30 < f3/f4 < 1.85,$$

where f3 is a focal length of the third lens group and f4 is a focal length of the fourth lens group.

The method according to an embodiment of the present invention may further comprise a fifth lens group having a positive refracting power on the image side of the fourth lens group.

In the method according to an embodiment of the present invention, the fifth lens group may be moved to the object side to adjust focus to a close object.

An optical apparatus according to an embodiment of the present invention (e.g., electronic still camera 1 in an embodiment) comprises any one of the above-described zoom lenses, which forms an image of an object on a predetermined image plane.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DESCRIPTION OF THE PREFERRED EMBODIMENTS

Figure 1:
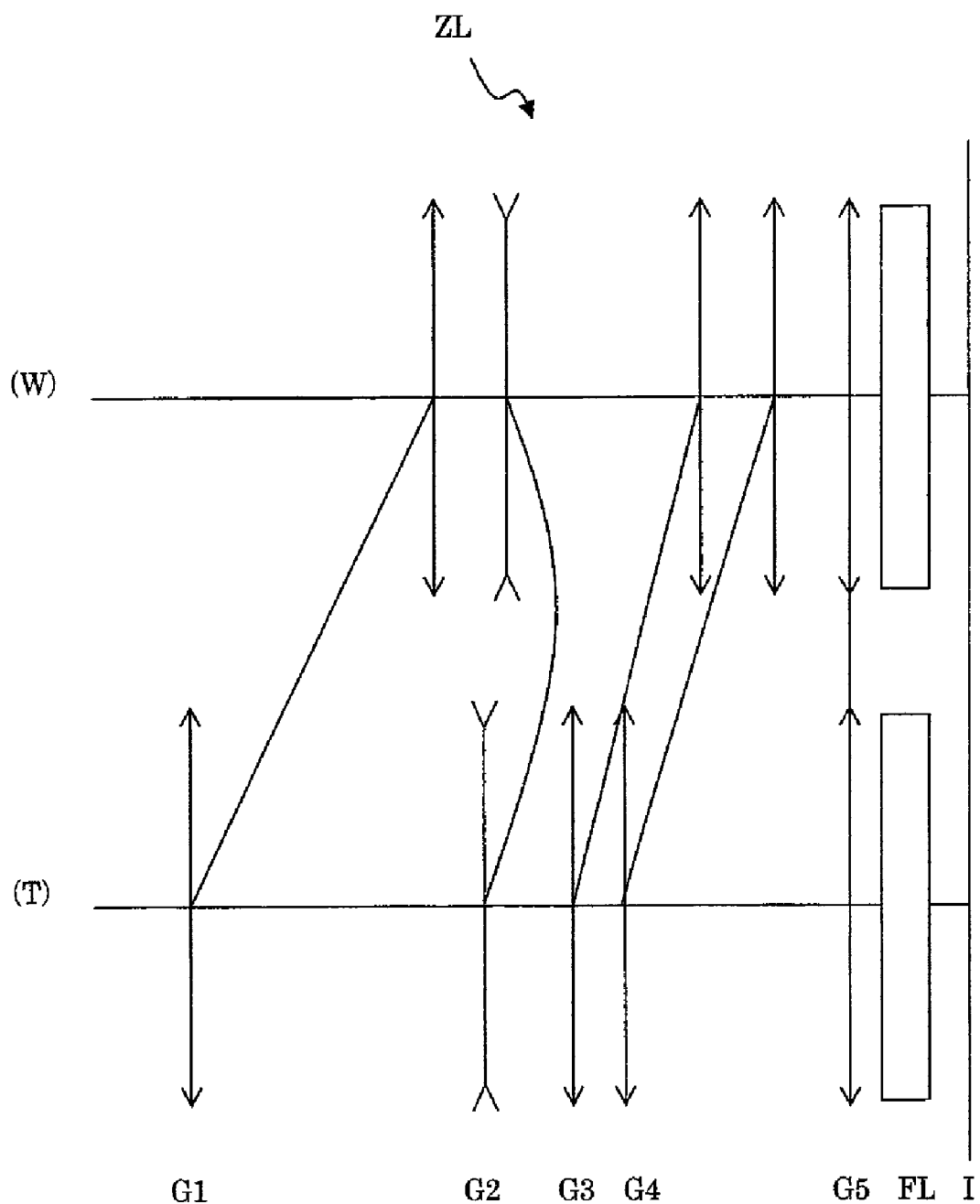
FIG. 1 is a refracting power layout of a zoom lens according to an embodiment of the present invention.

The preferred embodiments of the present invention will be described below with reference to the drawings. First, a configuration of a zoom lens ZL according to an embodiment of the present invention will be described using FIG. 2. This zoom lens ZL has the following lens groups in the order from the object side: a first lens group G1 having a positive refracting power; a second lens group G2 having a negative refracting power; a third lens group G3 having a positive refracting power; and a fourth lens group G4 having a positive refracting power; and is configured so that, with a change in the focal length from a wide-angle end state (a state in which the focal length is the shortest) to a telephoto end state (a state in which the focal length is the longest), at least the first lens group G1 and the fourth lens group G4 move to the object side so as to increase a space between the first lens group G1 and the second lens group G2, decrease a space between the second lens group G2 and the third lens group G3, and decrease a space between the third lens group G3 and the fourth lens group G4. This zoom lens ZL is able to achieve excellent imaging performance with the angle of view at the wide-angle end of over 75° and with the zoom ratio of about 10× or more.

The functions of the respective lens groups will be described below. The first lens group G1 has an action to converge a light beam and is arranged to be as close to the image plane in the wide-angle end state as possible so that off-axis rays can pass away from the optical axis, whereby the lens diameter of this first lens group G1 is made smaller. The first lens group G1 is moved to the object side so as to increase the space to the second lens group G2 in the telephoto end state, which enhances the converging action and decreases the total length of the lens system.

The second lens group G2 has an action to enlarge an image of an object formed by the first lens group G1, and the space between the first lens group G1 and this second lens group G2 is increased with change from the wide-angle end state to the telephoto end state, to increase an enlargement rate and vary the focal length.

The third lens group G3 has an action to converge the beam enlarged by the second lens group G2, and this third lens group G3 is desirably composed of a plurality of lens groups, as described below, in order to achieve higher performance.

The fourth lens group G4 has an action to further converge the beam converged by the third lens group G3, and the space between the third lens group G3 and the fourth lens group G4 is positively changed with change in the focal length, which can suppress fluctuations of the image plane against change in the focal length.

When in the zoom lens ZL of the present embodiment at least one surface in the third lens group G3 is an aspherical surface, it becomes feasible to correct well for comatic aberration and curvature of field caused by the third lens group G3 alone.

In the zoom lens ZL of the present embodiment, the third lens group G3 is desirably configured as follows in order to achieve much higher performance. Namely, in order to correct well for axial aberration caused by the third lens group G3 alone, the third lens group G3 is desirably composed of the following lenses in the order from the object side: a positive lens L31 with a convex surface on the object side; a cemented lens consisting of a positive lens L32 with a convex surface on the object side and a negative lens L33 with a concave surface on the image side; and a negative meniscus lens L34 with a convex surface on the image side. In this configuration, preferably, the zoom lens ZL has an aperture stop S between the second lens group G2 and the third lens group G3 and the aperture stop S is configured to move together with the third lens group G3, upon zooming. Since the negative meniscus lens L34 is a single lens, the zoom lens ZL can be constructed in a smaller size.

Furthermore, the cemented lens consisting of the positive lens L32 with the convex surface on the object side and the negative lens L33 with the concave surface on the image side in the third lens group G3, is desirably a cemented lens having a negative refracting power. When it has the negative refracting power, it becomes feasible to achieve an appropriate refracting power layout in the third lens group G3 and to correct better for spherical aberration and curvature of field caused by this third lens group G3 alone.

The zoom lens ZL of the present embodiment desirably satisfies the following condition expression (1):

$$1.30 < f3/f4 < 1.85 \qquad (1),$$

where f3 is the focal length of the third lens group G3 and f4 is the focal length of the fourth lens group G4.

The condition expression (1) is a condition expression for defining an appropriate range for the focal length ratio of the third lens group G3 and the fourth lens group G4. When the ratio is over the upper limit of this condition expression (1), the refracting power of the third lens group G3 becomes relatively weaker and the total lens length becomes larger. In addition, it is not preferable because correction becomes insufficient for spherical aberration and comatic aberration caused by the third lens group G3, so as to fail in achieving desired optical performance. On the other hand, when the ratio is below the lower limit of the condition expression (1), the refracting power of the second lens group G2 has to be strong in order to secure a sufficient back focus in the wide-angle end state, and it makes the diverging action stronger. It results in spreading the beam incident to the third lens group G3 and increasing spherical aberration caused by the third lens group G3 alone; therefore, the ratio below the lower limit is not preferable.

For ensuring the effect of the present embodiment, the upper limit of the condition expression (1) is preferably set to 1.80. For further ensuring the effect of the present embodiment, the upper limit of the condition expression (1) is more preferably set to 1.75. For ensuring the effect of the present embodiment, the lower limit of the condition expression (1) is preferably set to 1.35. For further ensuring the effect of the present embodiment, the lower limit of the condition expression (1) is more preferably set to 1.40.

The zoom lens ZL of the present embodiment desirably has a fifth lens group G5 having a positive refracting power on the image side of the fourth lens group G4. This fifth lens group G5 is stationary during carrying out zooming and functions to adjust focus of the object image formed by the first lens group G1 to the fourth lens group G4 and to control the position of the exit pupil. The zoom lens ZL is desirably configured so that the fifth lens group is stationary with respect to the image plane, upon zooming.

The zoom lens ZL of the present embodiment is desirably configured so that the fifth lens group G5 is moved to the object side so as to adjust focus to a close object. This zoom lens ZL adjusts focus of the object image formed by the first lens group G1 to the fourth lens group G4 and controls the position of the exit pupil. For that, this fifth lens group G5 is moved in the focus adjustment whereby the position of the exit pupil can be better corrected.

The zoom lens ZL of the present embodiment in the above-described configuration desirably satisfies the following condition expression (2):

$$4.7 < f5/fw < 15.1 \tag{2},$$

where fw is the focal length of the entire lens system in the wide-angle end state and f5 is the focal length of the fifth lens group G5.

The condition expression (2) is a condition expression for defining an appropriate range for the focal length of the fifth lens group G5. The ratio over the upper limit of this condition expression (2) is not preferred because the refracting power of the fifth lens group G5 becomes too weak to correct well for comatic aberration caused by the fifth lens group G5 alone. In addition, the moving distance becomes larger during focusing and a focusing mechanism can become larger in scale. On the other hand, the ratio below the lower limit of the condition expression (2) is not preferred because the refracting power of the fifth lens group G5 becomes too strong and the fifth lens group G5 alone gives rise to large spherical aberration.

In order to ensure the effect of the present embodiment, the upper limit of the condition expression (2) is preferably set to 14.0. For further ensuring the effect of the present embodiment, the upper limit of the condition expression (2) is more preferably set to 13.5. For ensuring the effect of the present embodiment, the lower limit of the condition expression (2) is preferably set to 5.0. For further ensuring the effect of the present embodiment, the lower limit of the condition expression (2) is more preferably set to 5.5.

In the zoom lens ZL of the present embodiment, the fifth lens group G5 is desirably a single lens component. This configuration permits the focal length to be set long to weaken the refracting power, whereby it is feasible to suppress fluctuations of astigmatism and curvature of field during short-range photography.

In the zoom lens ZL of the present embodiment, the fifth lens group G5 is desirably composed of a cemented lens consisting of a positive lens and a negative lens in order to minimize short-range fluctuations of curvature of field due to focusing.

The zoom lens ZL of the present embodiment desirably has a layout in which at least one surface in the third lens group G3 is an aspherical surface (in the case of FIG. 2, as described below, the twenty first surface of negative meniscus lens L34 is an aspherical surface). When an aspherical lens is arranged in the third lens group G3, it becomes feasible to correct well for comatic aberration and curvature of field caused by the third lens group G3 alone.

The zoom lens ZL of the present embodiment desirably satisfies the following condition expression (3):

$$0.19 < f3/f5 < 0.56 \tag{3},$$

where f3 is the focal length of the third lens group G3 and f5 is the focal length of the fifth lens group G5.

The condition expression (3) is a condition expression for defining an appropriate range for the focal length of the third lens group G3. The ratio over the upper limit of this condition expression (3) is not preferable because the refracting power of the third lens group G3 becomes relatively weaker and the total lens length becomes larger. In addition, it is not preferable because correction becomes insufficient for spherical aberration and comatic aberration caused by the third lens group G3, so as to fail in achieving desired optical performance. On the other hand, the ratio below the lower limit of the condition expression (3) is not preferable because it becomes impossible to secure a sufficient back focus in the wide-angle end state. In addition, it is not preferable because correction becomes excessive for spherical aberration and comatic aberration cause by the third lens group G3, so as to fail in achieving desired optical performance.

For ensuring the effect of the present embodiment, the upper limit of the condition expression (3) is preferably set to 0.51. For further ensuring the effect of the present embodiment, the upper limit of the condition expression (3) is more preferably set to 0.47. For ensuring the effect of the present embodiment, the lower limit of the condition expression (3) is preferably set to 0.22. For further ensuring the effect of the present embodiment, the lower limit of the condition expression (3) is more preferably set to 0.26.

Figure 14A:
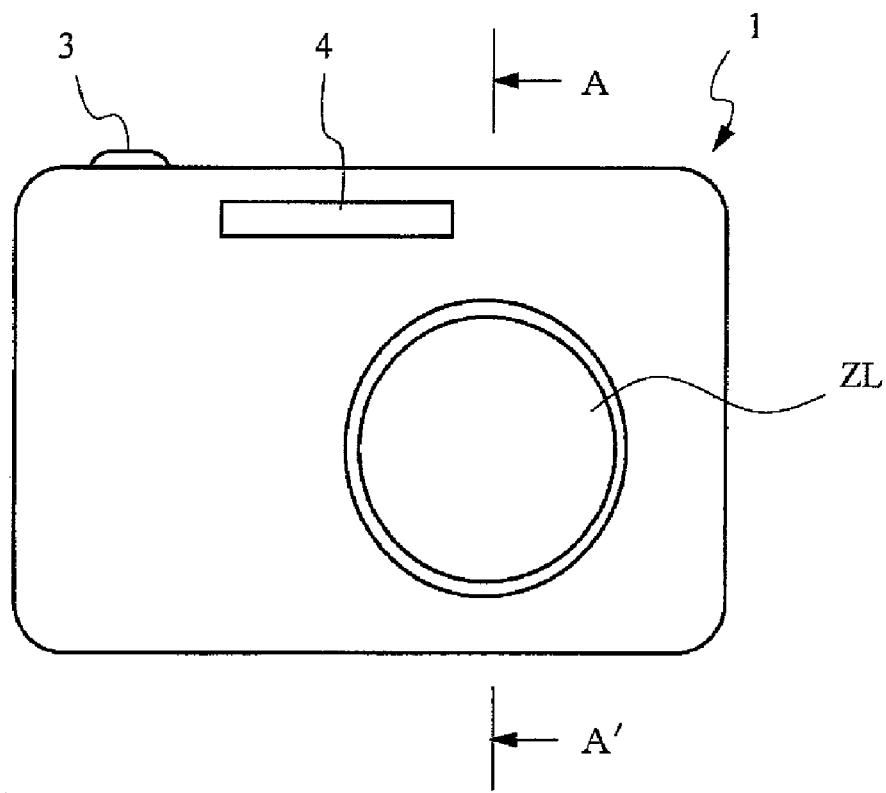
FIG. 14A is a front view of an electronic still camera equipped with a zoom lens according to an embodiment of the present invention.
Figure 14B:
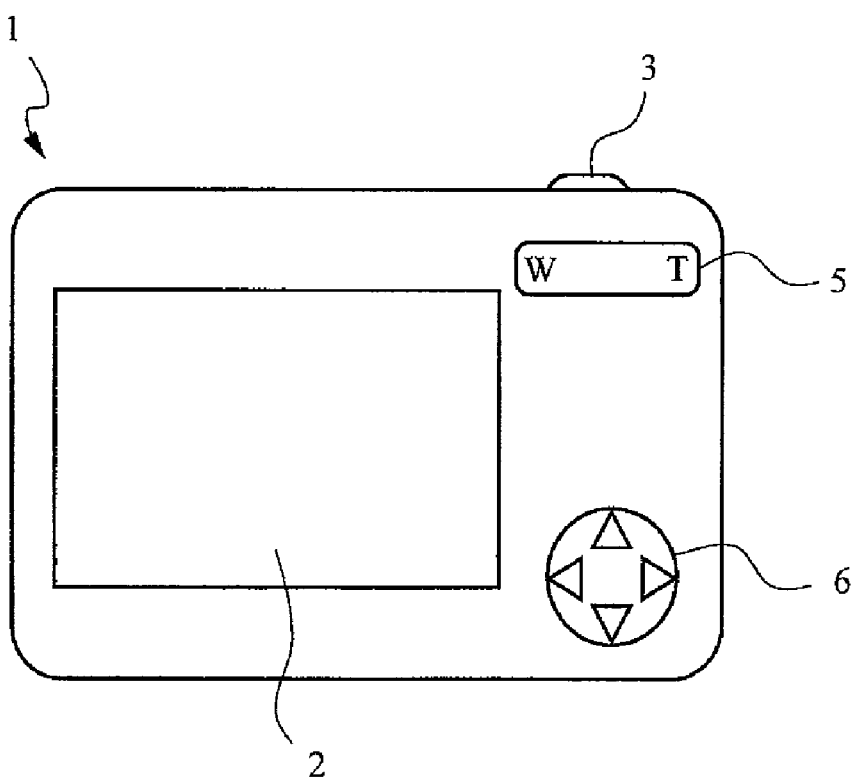
FIG. 14B is a back view of an electronic still camera equipped with a zoom lens according to an embodiment of the present invention.
Figure 15:
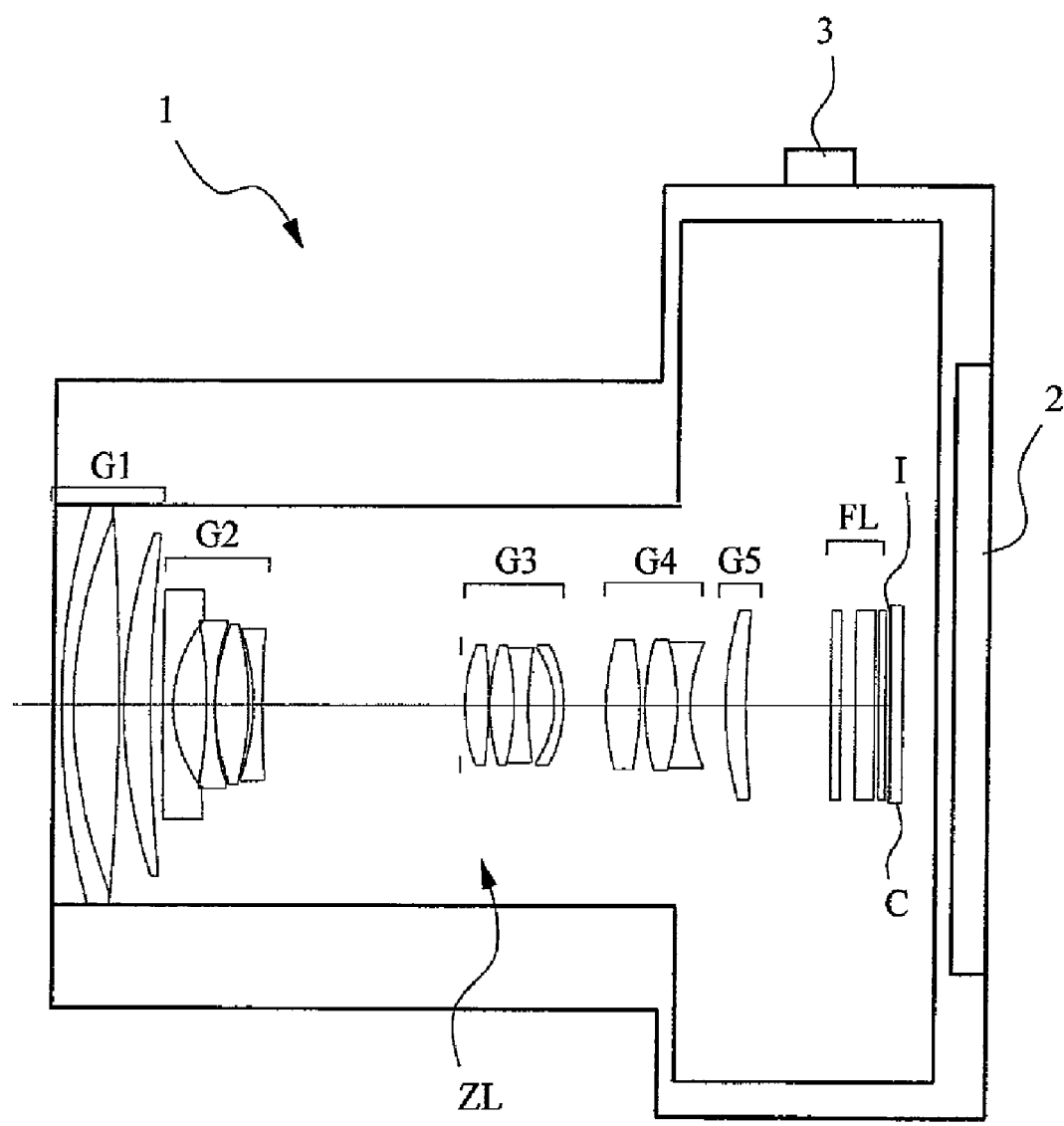
FIG. 15 is a sectional view along line A-A' in FIG. 14A.

FIG. 14A, FIG. 14B and FIG. 15 show a configuration of an electronic still camera 1 (which will be hereinafter referred to simply as a camera) as an optical apparatus equipped with the above-described zoom lens ZL. This camera 1 is configured as follows: when an unrepresented power button is pushed, an unrepresented shutter of a taking lens (zoom lens ZL) is opened and the zoom lens ZL condenses light from an unrepresented object to form an image thereof on an imaging device C (e.g., a CCD, CMOS, or the like) arranged on an image plane I. The object image focused on the imaging device C is displayed on a liquid crystal monitor 2 arranged on the back side of the camera 1. A photographer determines a composition of the object image while watching the liquid crystal monitor 2, and depresses a release button 3 to take the object image through the imaging device C and store it in an unrepresented memory.

This camera 1 is provided with an auxiliary light emitter 4 for emitting auxiliary light for a dark object, a Wide (W)-Tele (T) button 5 for carrying out zooming the zoom lens ZL from the wide-angle end state (W) to the telephoto end state (T), a function button 6 used in setting various conditions of the camera 1, and so on.

The above description and embodiments herein below concern the zoom lens ZL of the 5-group configuration, but the above configuration, conditions, etc. are also applicable to other group configurations, e.g., a 6-group configuration. For example, the present embodiment showed the configuration in which the lens system was composed of the four movable groups, but it is also possible to add another lens group between the lens groups, or to add another lens group adjacent to the lens system on the image side or on the object side. A lens group refers to a portion having at least one lens, which is separated by an air space varying during carrying out zooming.

It is also possible to adopt a focusing lens group which effects focusing from an infinite object to a close object by moving a single lens group or two or more lens groups, or a partial lens group in the direction of the optical axis. In this case, the focusing lens group is also applicable to autofocus and is also suitable for driving by a motor (such as an ultrasonic motor) for autofocus. Particularly, the fifth lens group G5 is preferably composed of a focusing lens group.

In the embodiment of the present invention, in order to prevent a failure in photography due to image blurring caused by hand shakes or the like likely to occur in the zoom lens of a high zoom ratio, the lens system may be combined with a vibration detecting system for detecting vibration of the lens system, and a driving unit; the whole or part of one lens group among those forming the lens system is arranged as an antivibration lens group to be decentered; the driving unit drives the antivibration lens group so as to correct for the image blurring (fluctuations of the position of the image plane) due to vibration of the lens system detected by the vibration detecting system; the image is shifted thereby, to correct for the image blurring. Particularly, the second lens group G2 or the fourth lens group G4 is preferably configured as the antivibration lens group. In this manner, the zoom lens ZL of the present embodiment can be made to function as a so-called antivibration optical system.

The above described the configuration wherein at least one aspherical lens was arranged in the third lens group G3, but it is also possible to adopt another configuration wherein a lens surface of another lens group is also made as an aspherical surface. In this case, the aspherical surface may be any one of an aspherical surface made by grinding, a glass mold aspherical surface molded in an aspherical shape of glass with a mold, and a composite aspherical surface formed in an aspherical shape of a resin on a surface of glass.

The aperture stop S is preferably located near the third lens group G3 as described above, but a lens frame may be used in place of the aperture stop so as to exercise the function thereof, without provision of any member as the aperture stop.

Furthermore, each lens surface may be coated with an antireflection film having high transmittance in a wide wavelength range, which reduces flares and ghosts and achieves high optical performance with high contrast.

The embodiment of the present invention was described with the constituent features of the embodiment in order to explain the invention comprehensibly, but it is needless to mention that the present invention is by no means limited to them.

EMBODIMENTS

Each of embodiments of the present invention will be described below on the basis of the accompanying drawings. FIG. 1 is a drawing showing a refracting power layout of a zoom lens ZL according to the present embodiment and a state of movement of each of lens groups with a change in the focal length state from the wide-angle end state (W) to the telephoto end state (T). As shown in this FIG. 1, the zoom lens ZL of the present embodiment is composed of the following components in the order from the object side: a first lens group G1 having a positive refracting power; a second lens group G2 having a negative refracting power; a third lens group G3 having a positive refracting power; a fourth lens group G4 having a positive refracting power; a fifth lens group G5 having a positive refracting power; and a filter group FL consisting of a low-pass filter, an infrared cut filter, and so on. With the change in the focal length state from the wide-angle end state to the telephoto end state (i.e., during carrying out zooming), the first lens group G1 moves relative to the image plane, the space between the first lens group G1 and the second lens group G2 varies, the space between the second lens group G2 and the third lens group G3 decreases, the space between the third lens group G3 and the fourth lens group G4 decreases, the space between the fourth lens group G4 and the fifth lens group G5 increases, the first lens group G1, the third lens group G3, and the fourth lens group G4 move to the object side, the second lens group G2 moves, and the fifth lens group G5 is stationary.

In each embodiment, an aspherical surface is expressed by Eq (a) below, where y is a height in a direction perpendicular to the optical axis, S(y) is a distance along the optical axis from a tangent plane at a top of the aspherical surface at the height y to the aspherical surface (sag), r is a radius of curvature of a reference spherical surface (paraxial radius of curvature), κ is the conic constant, and An is the nth-order aspheric coefficient. In the embodiments hereinafter "E-n" represents "×10$^{-n}$."

$$S(y)=(y^2/r)/\{1+(1-\kappa \times y^2/r^2)^{1/2}\}+A4 \times y^4+A6 \times y^6+A8 \times y^8+A10 \times y^{10} \quad (a)$$

In each embodiment, the second-order aspheric coefficient A2 is 0. In the tables of the embodiments, each aspherical surface is provided with mark * on the left side of a surface number.

First Embodiment

Figure 2:
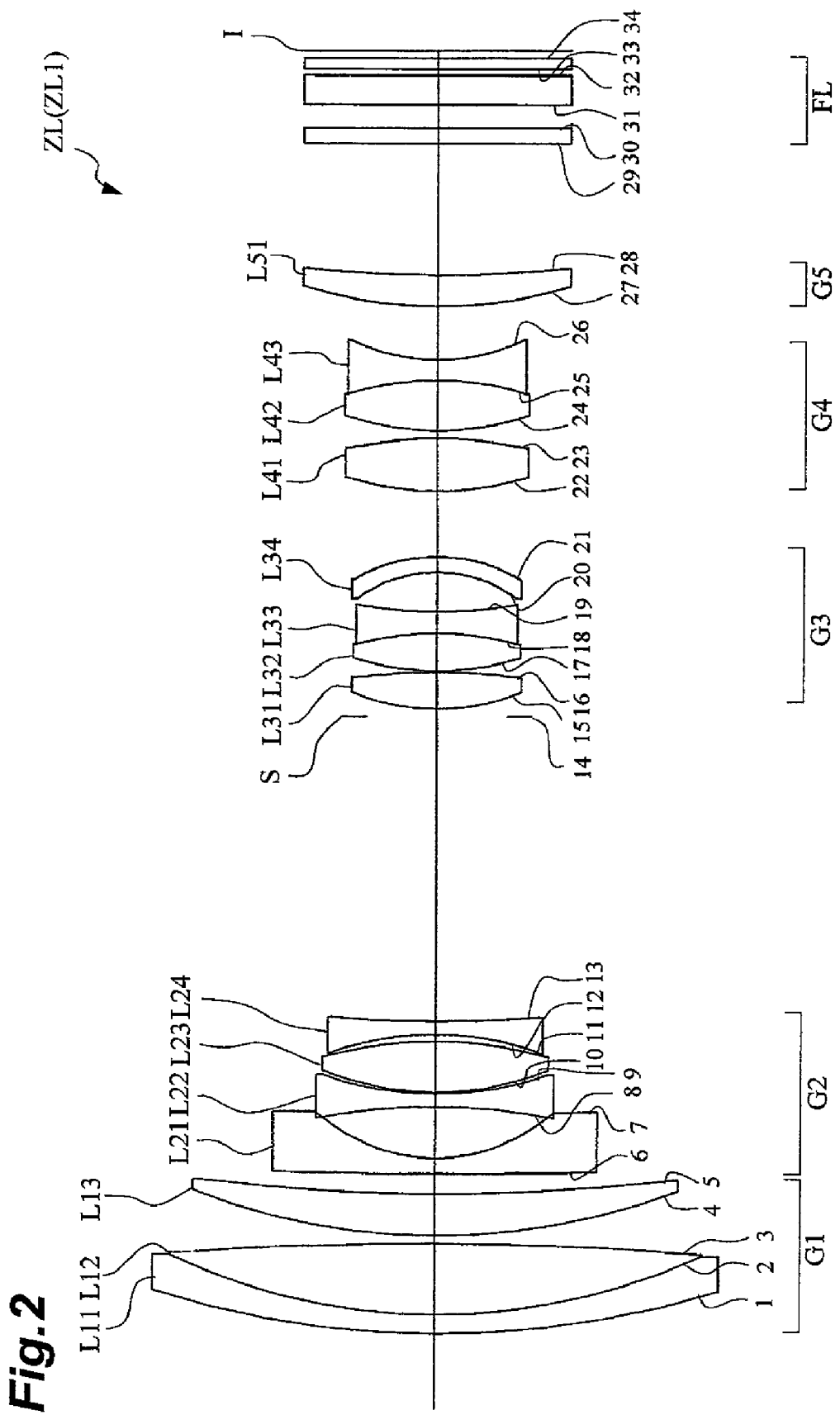
FIG. 2 is a sectional view showing a configuration of a zoom lens according to a first embodiment.

FIG. 2 is a drawing showing a configuration of a zoom lens ZL1 according to the first embodiment of the present invention. In this zoom lens ZL1 of FIG. 2, the first lens group G1 is composed of a cemented positive lens consisting of a negative meniscus lens L11 with a convex surface on the object side and a biconvex lens L12 cemented together, and a positive meniscus lens L13 with a convex surface on the object side, which are arranged in the order from the object side. The second lens group G2 is composed of a negative meniscus lens L21 with an aspherical surface on the image side and a convex surface on the object side, a biconcave lens L22, a biconvex lens L23, and a biconcave lens L24, which are arranged in the order from the object side. The third lens group G3 is composed of a biconvex lens L31, a cemented negative lens consisting of a biconvex lens L32 and a biconcave lens L33 cemented together, and a negative meniscus lens L34 with an aspherical surface on the image side and a concave surface on the object side, which are arranged in the order from the object side. The fourth lens group G4 is composed of a biconvex lens L41 with a surface of an aspherical shape on the image side, and a cemented negative lens consisting of a biconvex lens L42 and a biconcave lens L43 cemented together, which are arranged in the order from the object side. The fifth lens group G5 is composed of a positive meniscus lens L51 with a convex surface on the object side. Furthermore, the filter group FL is composed of a low-pass filter, an infrared cut filter, and so on.

The image plane I is formed on an unrepresented imaging device and the imaging device is composed of a CCD, CMOS, or the like (the same also applies to the embodiments hereinafter). The aperture stop S is located in front of the third lens group G3 on the object side and moves together with the third lens group G3 during carrying out zooming from the wide-angle end state to the telephoto end state.

Table 1 below presents values of specifications in the first embodiment. In this table 1, f represents the focal length, F.NO the F number, 2ω the angle of view, and Bf the back focus. Furthermore, the surface number represents an order of a lens surface from the object side along the traveling direction of rays, and the refractive index and Abbe number represent values for the d line (λ=587.6 nm). It is noted herein that the groups of the focal length f, the radius r of curvature, surface separation d, and other lengths presented in all the specification values below are "mm" in general, but the group does not have to be limited to it because the optical system provides equivalent optical performance even if it is proportionally enlarged or reduced. The radius of curvature, 0.0000, indicates a plane and the refractive index of air, 1.00000, is omitted. These definitions of symbols and specification tables also apply similarly to the embodiments hereinafter. In tables 1, 3, 5, 7, 9, 11, 13, and 15 below, W presents wide-angle end state, IFL1 intermediate focal length state 1, IFL2 intermediate focal length state 2, and T telephoto end state. Furthermore, in tables 1, 5, 9, and 13 below, s presents Surface number, r Radius of curvature, d Surface separation, n Refractive index, and ν Abbe number.

of the aspherical surfaces, i.e., values of the radius R of curvature at the top, the conic constant κ, and the aspheric constants A4-A10.

TABLE 2

| R | κ | A4 | A6 | A8 | A10 |
|---|---|---|---|---|---|
| [7th surface] | | | | | |
| 11.9202 | +1.3973 | −4.8418E−5 | −5.5604E−7 | +9.2367E−9 | −9.6754E−11 |
| [21st surface] | | | | | |
| −11.9161 | −0.3804 | −1.6350E−4 | −1.1190E−6 | +2.4626E−10 | −6.2008E−11 |
| [23rd surface] | | | | | |
| −21.5704 | −0.1081 | +1.2594E−4 | +3.2370E−7 | −9.0372E−9 | +7.2190E−11 |

TABLE 1

| | W | | IFL1 | | IFL2 | | T |
|---|---|---|---|---|---|---|---|
| f = | 10.51 | ~ | 29.02 | ~ | 70.00 | ~ | 107.09 |
| F. NO = | 2.86 | ~ | 4.17 | ~ | 5.37 | ~ | 6.01 |
| 2ω = | 80.69 | ~ | 31.58 | ~ | 13.44 | ~ | 8.87 |
| total length = | 83.47 | ~ | 98.75 | ~ | 120.72 | ~ | 130.00 |
| total height = | 8.50 | ~ | 8.50 | ~ | 8.50 | ~ | 8.50 |

| s | r | d | n | ν |
|---|---|---|---|---|
| 1 | 68.3307 | 1.20 | 1.84666 | 23.78 |
| 2 | 44.0048 | 4.55 | 1.49700 | 81.54 |
| 3 | −232.1284 | 0.50 | | |
| 4 | 48.2423 | 2.67 | 1.64000 | 60.08 |
| 5 | 139.7572 | (d5) | | |
| 6 | 600.0000 | 1.00 | 1.80139 | 45.45 |
| *7 | 11.9202 | 3.30 | | |
| 8 | −45.1215 | 0.85 | 1.77250 | 49.60 |
| 9 | 24.1233 | 0.10 | | |
| 10 | 20.7444 | 3.32 | 1.84666 | 23.78 |
| 11 | −28.3936 | 0.45 | | |
| 12 | −21.5377 | 0.85 | 1.74100 | 52.64 |
| 13 | 90.1818 | (d13) | | |
| 14 | 0.0000 | 0.50 | (aperture stop S) | |
| 15 | 15.9769 | 2.39 | 1.60300 | 65.44 |
| 16 | −43.6818 | 0.10 | | |
| 17 | 19.9575 | 2.48 | 1.49700 | 81.54 |
| 18 | −20.6511 | 1.41 | 1.88300 | 40.76 |
| 19 | 32.4381 | 2.59 | | |
| 20 | −9.3107 | 1.00 | 1.80610 | 40.73 |
| *21 | −11.9161 | (d21) | | |
| 22 | 20.8142 | 3.48 | 1.61881 | 63.85 |
| *23 | −21.5704 | 0.50 | | |
| 24 | 19.8759 | 3.29 | 1.60300 | 65.44 |
| 25 | −20.4108 | 1.33 | 1.77250 | 49.60 |
| 26 | 13.5829 | (d26) | | |
| 27 | 32.1970 | 2.02 | 1.49700 | 81.54 |
| 28 | 89.5240 | (d28) | | |
| 29 | 0.0000 | 1.00 | 1.51680 | 64.12 |
| 30 | 0.0000 | 1.50 | | |
| 31 | 0.0000 | 1.87 | 1.51680 | 64.12 |
| 32 | 0.0000 | 0.40 | | |
| 33 | 0.0000 | 0.70 | 1.51680 | 64.12 |
| 34 | 0.0000 | (Bf) | | |

In this first embodiment, each lens surface of the seventh surface, the twenty first surface, and the twenty third surface is formed in an aspherical shape. Table 2 below provides data In this first embodiment, the following spaces vary during carrying out zooming: the axial air space d5 between the first lens group G1 and the second lens group G2; the axial air space d13 between the second lens group G2 and the third lens group G3; the axial air space d21 between the third lens group G3 and the fourth lens group G4; the axial air space d26 between the fourth lens group G4 and the fifth lens group G5; the axial air space d28 between the fifth lens group G5 and the filter group FL; and the back focus Bf. Table 3 below presents variable spaces at each of focal lengths in the wide-angle end state, intermediate focal length state 1, intermediate focal length state 2, and the telephoto end state.

TABLE 3

| | W | IFL1 | IFL2 | T |
|---|---|---|---|---|
| f | 10.5100 | 29.0153 | 70.0000 | 107.0901 |
| d5 | 1.3000 | 13.7229 | 28.1433 | 33.1977 |
| d13 | 19.9859 | 8.6270 | 3.7287 | 1.3000 |
| d21 | 4.2961 | 2.3545 | 1.3526 | 0.8000 |
| d26 | 3.5062 | 19.6621 | 33.1096 | 40.3197 |
| d28 | 8.5300 | 8.5300 | 8.5300 | 8.5300 |
| Bf | 0.5000 | 0.5001 | 0.5001 | 0.5001 |

Table 4 below presents values corresponding to the respective condition expressions in the first embodiment. In this Table 4, fw represents the focal length of the entire system, f1 the focal length of the first lens group G1, f2 the focal length of the second lens group G2, f3 the focal length of the third lens group G3, f4 the focal length of the fourth lens group G4, and f5 the focal length of the fifth lens group G5. The definition of these symbols also applies similarly to the embodiments hereinafter.

TABLE 4

| fw = 10.5100 |
|---|
| f1 = 65.7114 |
| f2 = −10.6324 |
| f3 = 38.6048 |
| f4 = 25.2814 |
| f5 = 100.0001 |
| (1)f3/f4 = 1.5270 |
| (2)f5/fw = 9.5147 |
| (3)f3/f5 = 0.3860 |

Figure 3A:
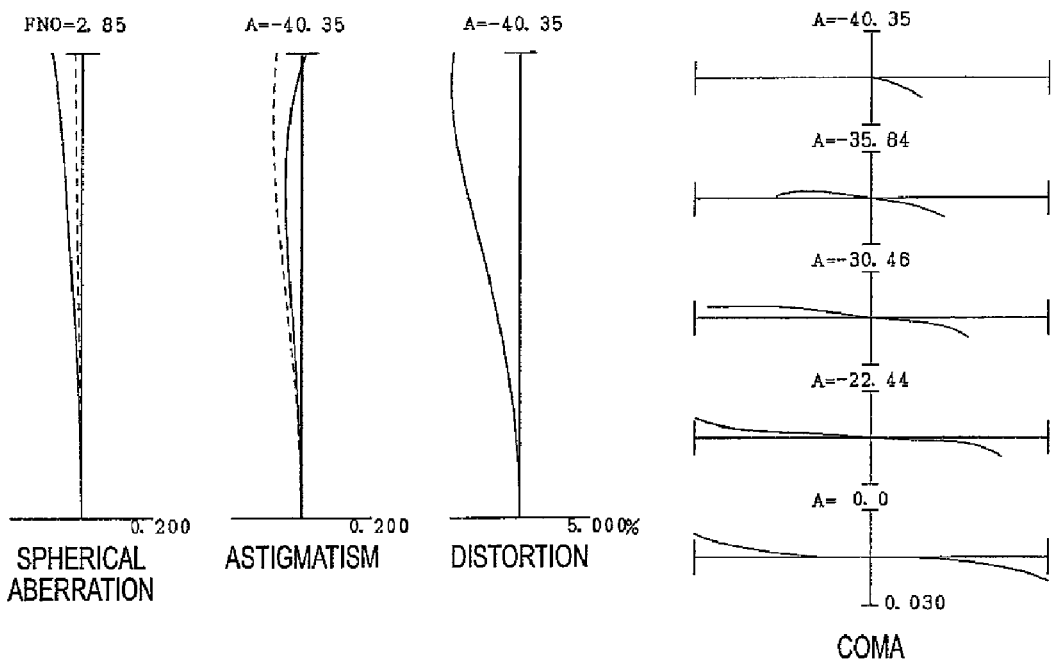
FIG. 3A is an aberration diagram showing aberrations in an infinity in-focus state in the wide-angle end state in the first embodiment.
Figure 3B:
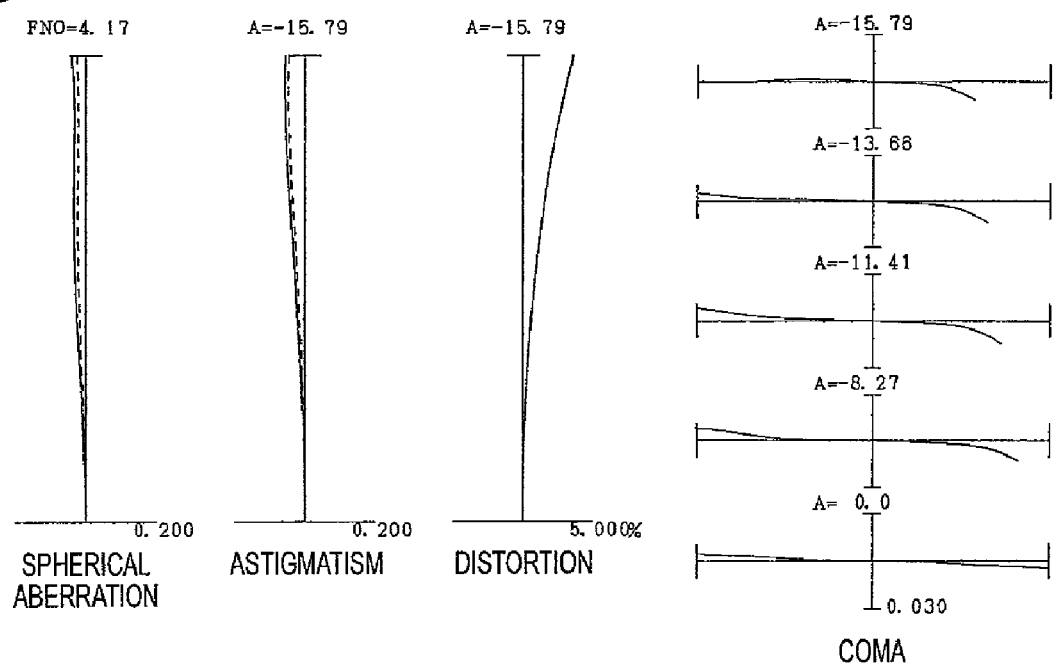
FIG. 3B is an aberration diagram showing aberrations in an infinity in-focus state in an intermediate focal length state 1 in the first embodiment.
Figure 4A:
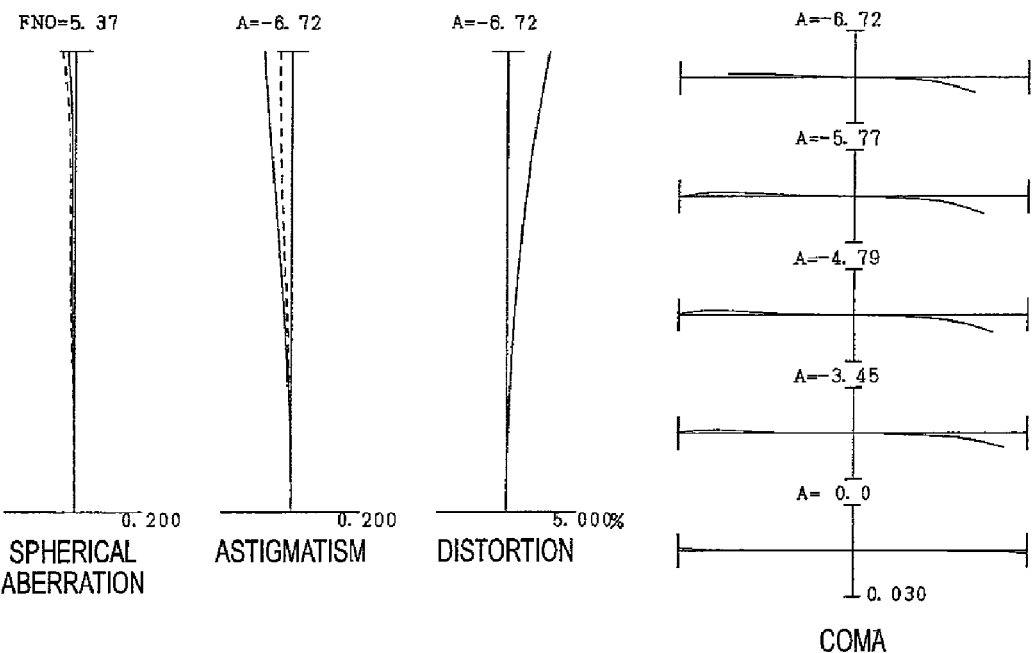
FIG. 4A is an aberration diagram showing aberrations in the infinity in-focus state in an intermediate focal length state 2 in the first embodiment.
Figure 4B:
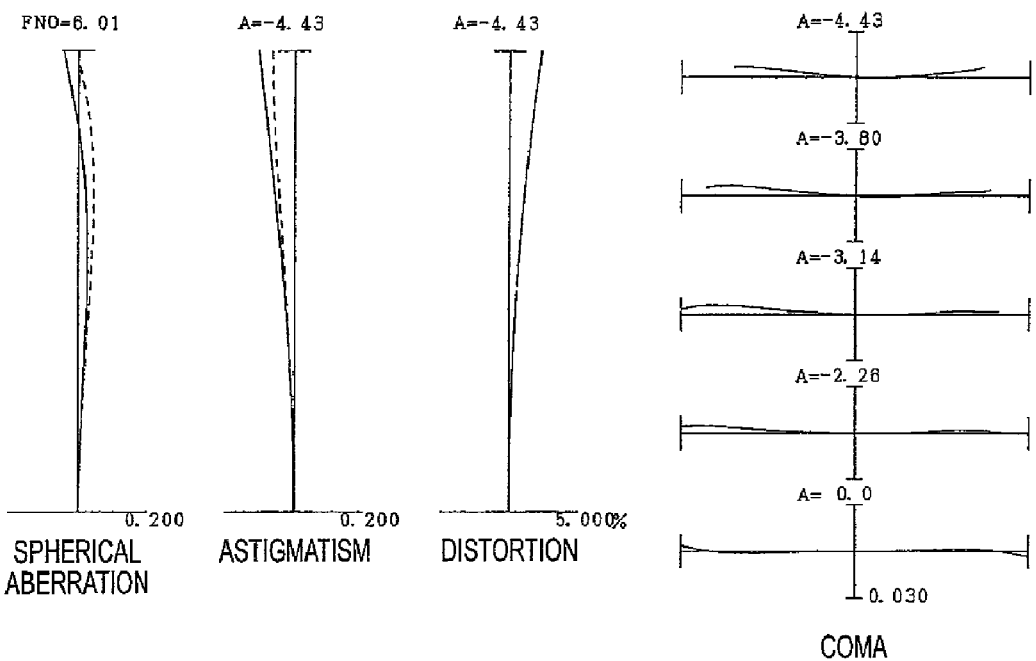
FIG. 4B is an aberration diagram showing aberrations in the infinity in-focus state in the telephoto end state in the first embodiment.

FIGS. 3A, 3B, 4A and 4B are aberration diagrams of aberrations in the first embodiment for the d line (λ=587.6 nm). Specifically, FIG. 3A is an aberration diagram of aberrations in the infinity in-focus state in the wide-angle end state (f=10.51 mm), FIG. 3B an aberration diagram of aberrations in the infinity in-focus state in the intermediate focal length state 1 (f=29.02 mm), FIG. 4A an aberration diagram of aberrations in the infinity in-focus state in the intermediate focal length state 2 (f=70.00 mm), and FIG. 4B an aberration diagram of aberrations in the infinity in-focus state in the telephoto end state (f=107.09 mm).

In each aberration diagram, FNO represents the F number, Y an image height, and A a half angle of view for each image height. In the aberration diagrams showing astigmatism, a solid line indicates a sagittal image surface, and a dashed line a meridional image surface. Furthermore, in the aberration diagrams showing spherical aberration, a solid line indicates spherical aberration and a dashed line the sine condition. This description of the aberration diagrams also applies similarly to the embodiments hereinafter. It is apparent from the aberration diagrams that in the first embodiment the optical system is corrected well for the aberrations in each of the focal length states ranging from the wide-angle end state to the telephoto end state, and has excellent imaging performance.

Second Embodiment

Figure 5:
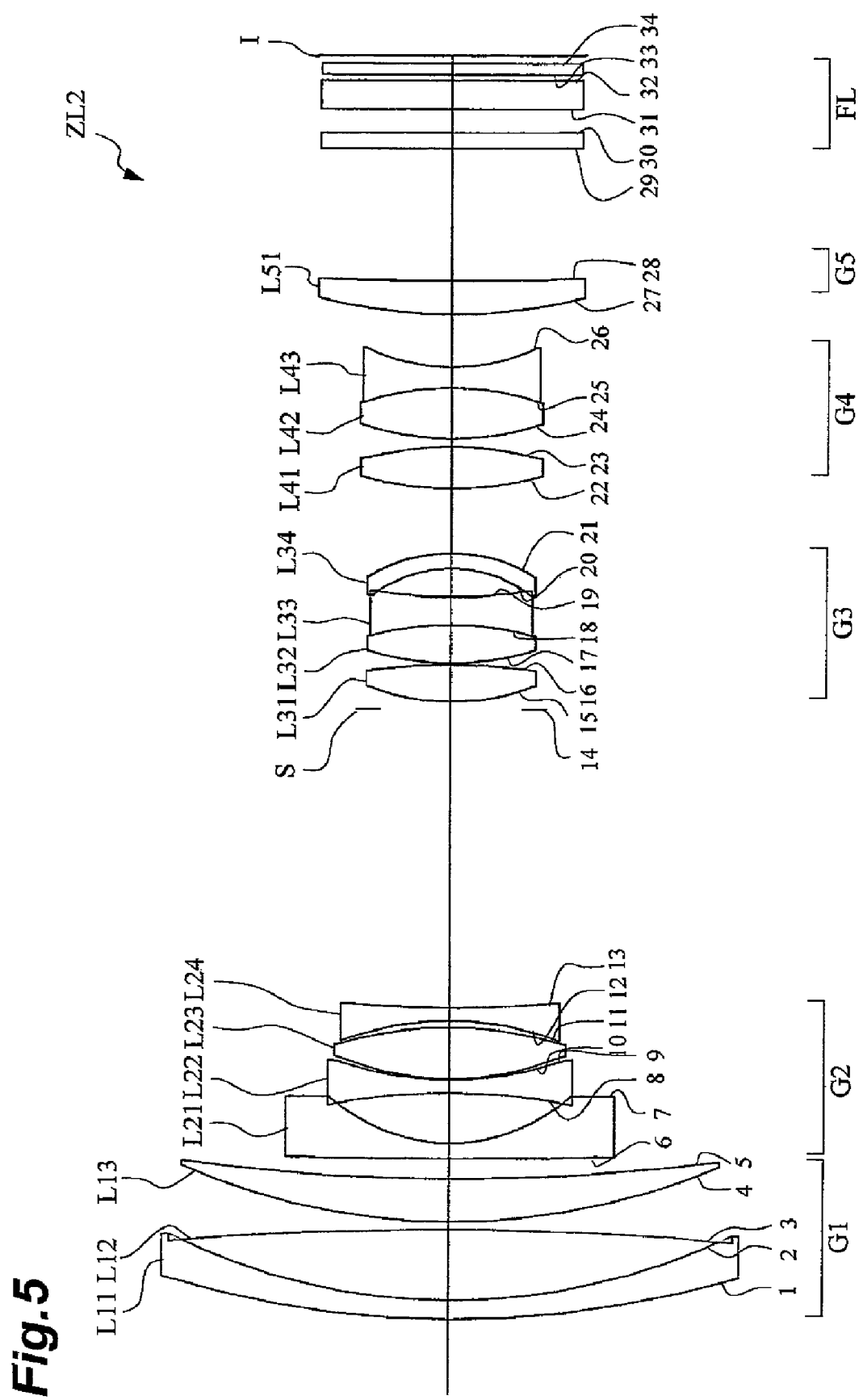
FIG. 5 is a sectional view showing a configuration of a zoom lens according to a second embodiment.

FIG. 5 is a drawing showing a configuration of a zoom lens ZL2 according to the second embodiment of the present invention. In this zoom lens ZL2 of FIG. 5, the first lens group G1 is composed of a cemented positive lens consisting of a negative meniscus lens L11 with a convex surface on the object side and a biconvex lens L12 cemented together, and a positive meniscus lens L13 with a convex surface on the object side, which are arranged in the order from the object side. The second lens group G2 is composed of a negative meniscus lens L21 with an aspherical surface on the image side and a convex surface on the object side, a biconcave lens L22, a biconvex lens L23, and a biconcave lens L24, which are arranged in the order from the object side. The third lens group G3 is composed of a biconvex lens L31, a cemented negative lens consisting of a biconvex lens L32 and a biconcave lens L33 cemented together, and a negative meniscus lens L34 with an aspherical surface on the image side and a concave surface on the object side, which are arranged in the order from the object side. The fourth lens group G4 is composed of a biconvex lens L41 with a surface of an aspherical shape on the image side and a cemented negative lens consisting of a biconvex lens L42 and a biconcave lens L43 cemented together, which are arranged in the order from the object side. The fifth lens group G5 is composed of a positive meniscus lens L51 with a convex surface on the object side. Furthermore, the filter group FL is composed of a low-pass filter, an infrared cut filter, and so on. The aperture stop S is located in front of the third lens group G3 on the object side and moves together with the third lens group G3 during carrying out zooming from the wide-angle end state to the telephoto end state.

Table 5 below presents values of specifications of this second embodiment.

TABLE 5

| | W | | IFL1 | | IFL2 | | T |
|---|---|---|---|---|---|---|---|
| f = | 10.51 | ~ | 26.97 | ~ | 70.00 | ~ | 107.09 |
| F. NO = | 2.81 | ~ | 4.15 | ~ | 5.40 | ~ | 6.07 |
| 2ω = | 79.23 | ~ | 33.16 | ~ | 13.10 | ~ | 8.63 |
| total length = | 82.04 | ~ | 95.61 | ~ | 120.17 | ~ | 130.00 |
| total height = | 8.50 | ~ | 8.50 | ~ | 8.50 | ~ | 8.50 |

| s | r | d | n | ν |
|---|---|---|---|---|
| 1 | 71.1707 | 1.20 | 1.84666 | 23.78 |
| 2 | 44.9397 | 4.51 | 1.49700 | 81.54 |
| 3 | −223.0288 | 0.50 | | |
| 4 | 47.2799 | 2.74 | 1.64000 | 60.08 |
| 5 | 143.0742 | (d5) | | |
| 6 | 540.3096 | 1.00 | 1.80139 | 45.45 |
| *7 | 12.1138 | 3.25 | | |
| 8 | −43.2307 | 0.85 | 1.77250 | 49.60 |
| 9 | 24.0563 | 0.10 | | |
| 10 | 20.9512 | 3.29 | 1.84666 | 23.78 |
| 11 | −27.8419 | 0.45 | | |
| 12 | −21.1048 | 0.85 | 1.74100 | 52.64 |
| 13 | 91.2436 | (d13) | | |
| 14 | 0.0000 | 0.50 | (aperture stop S) | |
| 15 | 16.2326 | 2.39 | 1.60300 | 65.44 |
| 16 | −43.8267 | 0.10 | | |
| 17 | 19.1663 | 2.52 | 1.49700 | 81.54 |
| 18 | −21.0122 | 1.82 | 1.88300 | 40.76 |
| 19 | 32.7971 | 1.86 | | |
| 20 | −9.0388 | 1.00 | 1.80610 | 40.73 |
| *21 | −11.6361 | (d21) | | |
| 22 | 23.6390 | 2.75 | 1.61881 | 63.85 |
| *23 | −19.2325 | 0.53 | | |
| 24 | 19.8235 | 3.32 | 1.60300 | 65.44 |
| 25 | −20.0480 | 1.36 | 1.77250 | 49.60 |
| 26 | 13.4859 | (d26) | | |
| 27 | 37.1724 | 2.18 | 1.49700 | 81.54 |
| 28 | 275.1742 | (d28) | | |
| 29 | 0.0000 | 1.00 | 1.51680 | 64.12 |
| 30 | 0.0000 | 1.50 | | |
| 31 | 0.0000 | 1.87 | 1.51680 | 64.12 |
| 32 | 0.0000 | 0.40 | | |
| 33 | 0.0000 | 0.70 | 1.51680 | 64.12 |
| 34 | 0.0000 | (Bf) | | |

In this second embodiment, each lens surface of the seventh surface, the twenty first surface, and the twenty third surface is formed in an aspherical shape. Table 6 below provides data of the aspherical surfaces, i.e., values of the radius R of curvature at the top, the conic constant κ, and the aspheric constants A4-A10.

TABLE 6

| R | κ | A4 | A6 | A8 | A10 |
|---|---|---|---|---|---|
| [7th surface] | | | | | |
| 12.1138 | +0.4410 | 2.0089E−5 | −1.0456E−8 | +1.8280E−9 | −1.5326E−11 |
| [21st surface] | | | | | |
| −11.6361 | −0.3038 | −1.6898E−4 | −1.3338E−6 | +4.2693E−10 | −8.0522E−11 |
| [23rd surface] | | | | | |
| −19.2325 | +0.0620 | +1.2468E−4 | +4.1609E−7 | −9.5581E−9 | +7.3350E−11 |

In this second embodiment, the following spaces vary during carrying out zooming: the axial air space d5 between the first lens group G1 and the second lens group G2; the axial air space d13 between the second lens group G2 and the third lens group G3; the axial air space d21 between the third lens group G3 and the fourth lens group G4; the axial air space d26 between the fourth lens group G4 and the fifth lens group G5; the axial air space d28 between the fifth lens group G5 and the filter group FL; and the back focus Bf. Table 7 below presents variable spaces at each of focal lengths in the wide-angle end state, intermediate focal length state 1, intermediate focal length state 2, and the telephoto end state.

TABLE 7

|     | W       | IFL1    | IFL2    | T        |
|-----|---------|---------|---------|----------|
| f   | 10.5100 | 26.9731 | 70.0001 | 107.0901 |
| d5  | 1.3000  | 11.6908 | 27.4600 | 32.4547  |
| d13 | 19.4755 | 8.8546  | 3.6639  | 1.3000   |
| d21 | 4.2432  | 2.3898  | 1.3331  | 0.8000   |
| d26 | 3.4570  | 19.1096 | 34.1494 | 41.8788  |
| d28 | 8.5300  | 8.5300  | 8.5300  | 8.5300   |
| Bf  | 0.5000  | 0.5000  | 0.5000  | 0.5000   |

Table 8 below presents values corresponding to the respective condition expressions in this second embodiment.

TABLE 8 fw = 10.5100
f1 = 65.1228
f2 = −10.6144
f3 = 37.8594
f4 = 25.4473
f5 = 86.2135
(1)f3/f4 = 1.4878
(2)f5/fw = 8.2030
(3)f3/f5 = 0.4391

Figure 6A:
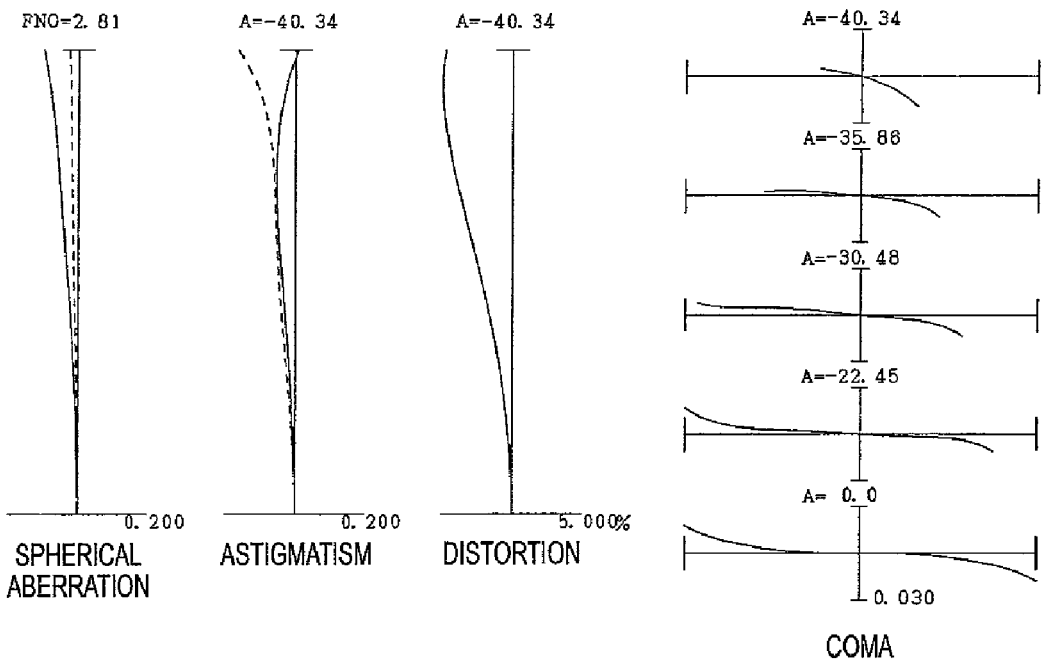
FIG. 6A is an aberration diagram showing aberrations in the infinity in-focus state in the wide-angle end state in the second embodiment.
Figure 6B:
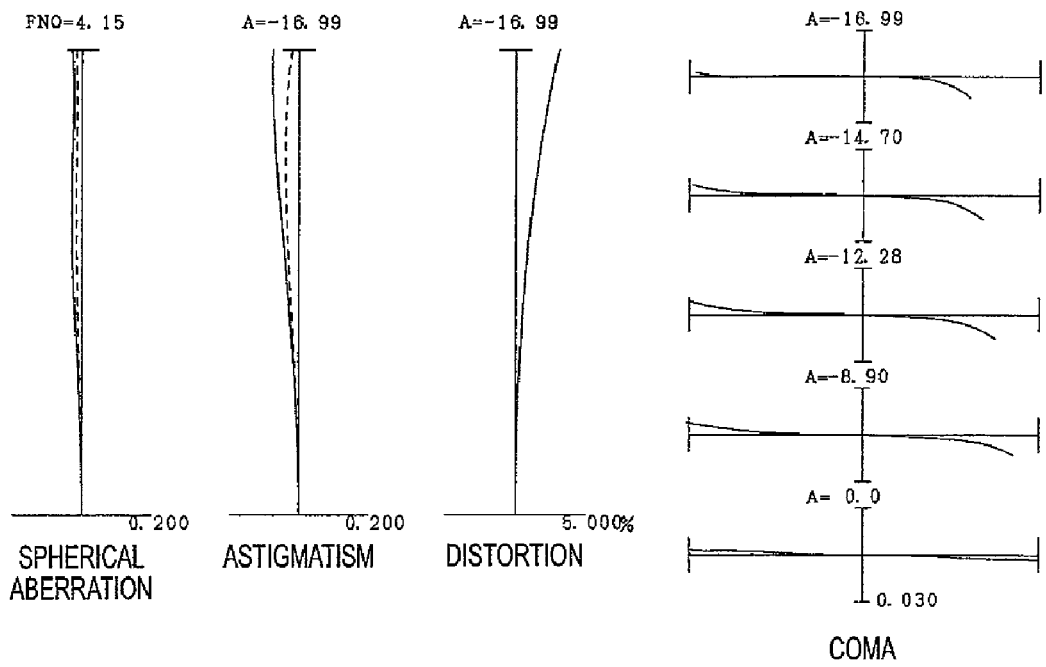
FIG. 6B is an aberration diagram showing aberrations in the infinity in-focus state in an intermediate focal length state 1 in the second embodiment.
Figure 7A:
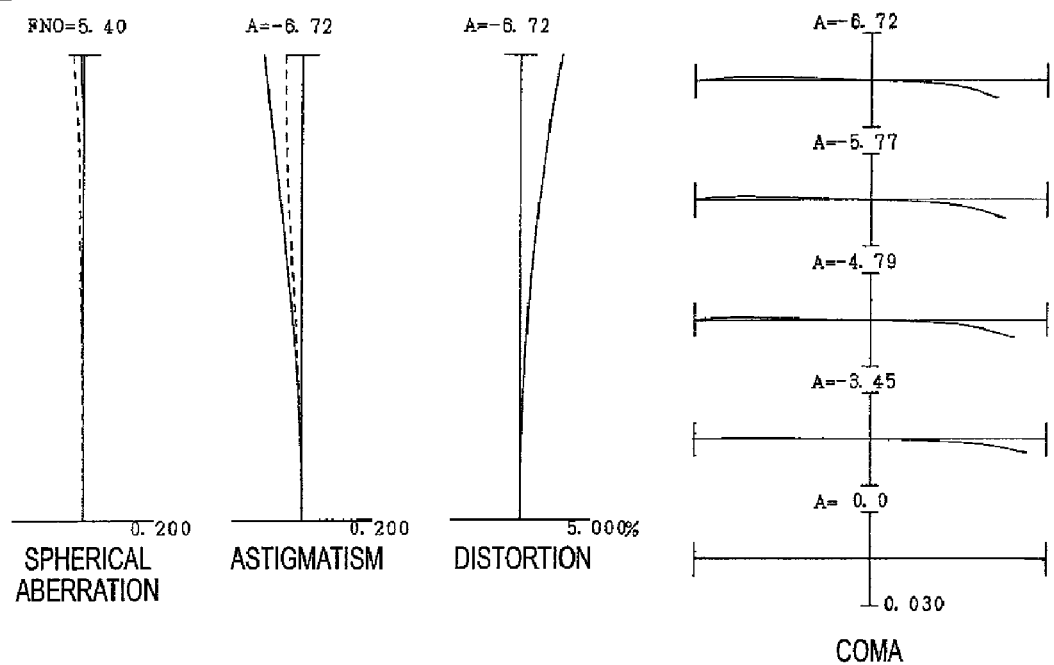
FIG. 7A is an aberration diagram showing aberrations in the infinity in-focus state in an intermediate focal length state 2 in the second embodiment.
Figure 7B:
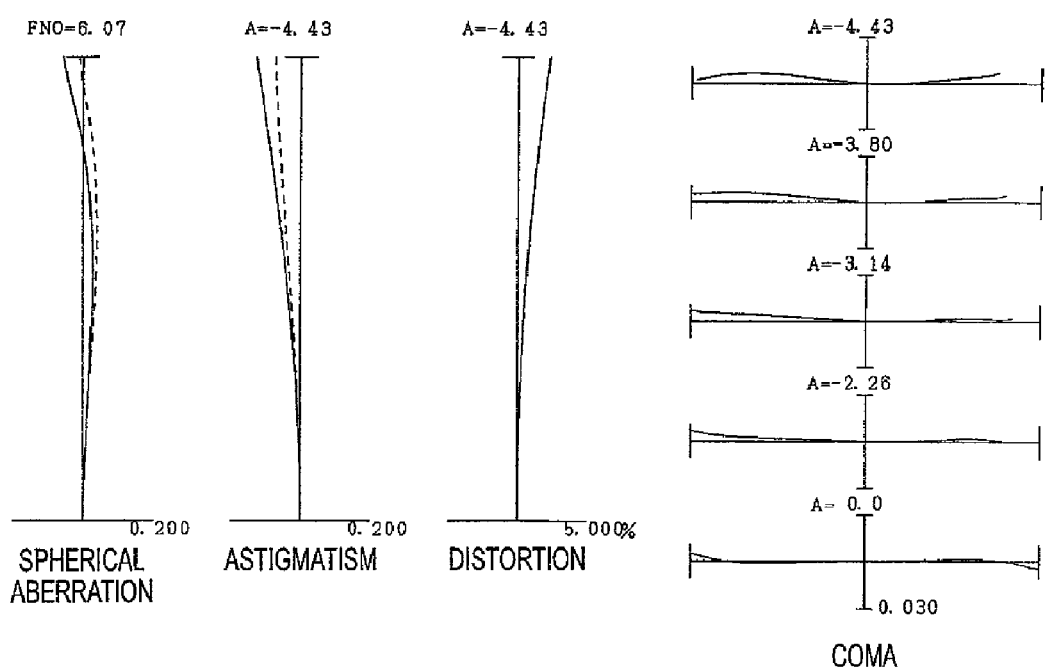
FIG. 7B is an aberration diagram showing aberrations in the infinity in-focus state in the telephoto end state in the second embodiment.

FIGS. 6A, 6B, 7A and 7B are aberration diagrams of aberrations in the second embodiment for the d line ($\lambda$=587.6 nm). Specifically, FIG. 6A is an aberration diagram of aberrations in the infinity in-focus state in the wide-angle end state (f=10.51 mm), FIG. 6B an aberration diagram of aberrations in the infinity in-focus state in the intermediate focal length state 1 (f=26.97 mm), FIG. 7A an aberration diagram of aberrations in the infinity in-focus state in the intermediate focal length state 2 (f=70.00 mm), and FIG. 7B an aberration diagram of aberrations in the infinity in-focus state in the telephoto end state (f=107.09 mm). It is apparent from the aberration diagrams that in the second embodiment the optical system is corrected well for the aberrations in each of the focal length states ranging from the wide-angle end state to the telephoto end state, and has excellent imaging performance.

Third Embodiment

Figure 8:
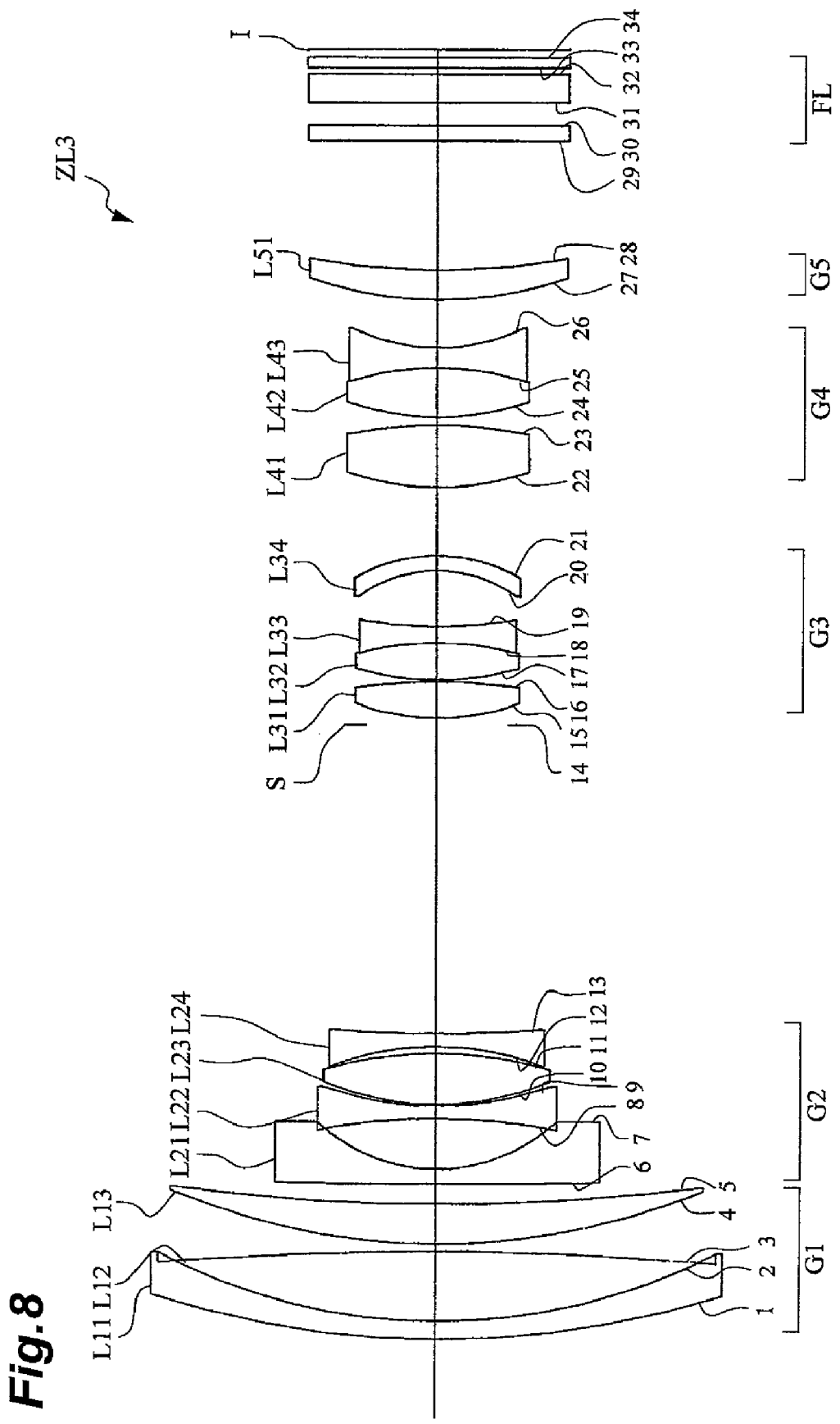
FIG. 8 is a sectional view showing a configuration of a zoom lens according to a third embodiment.

FIG. 8 is a drawing showing a configuration of a zoom lens ZL3 according to the third embodiment of the present invention. In this zoom lens ZL3 of FIG. 8, the first lens group G1 is composed of a cemented positive lens consisting of a negative meniscus lens L11 with a convex surface on the object side and a biconvex lens L12 cemented together, and a positive meniscus lens L13 with a convex surface on the object side, which are arranged in the order from the object side. The second lens group G2 is composed of a negative meniscus lens L21 with an aspherical surface on the image side and a convex surface on the object side, a biconcave lens L22, a biconvex lens L23, and a biconcave lens L24, which are arranged in the order from the object side. The third lens group G3 is composed of a biconvex lens L31, a cemented negative lens consisting of a biconvex lens L32 and a biconcave lens L33 cemented together, and a negative meniscus lens L34 with an aspherical surface on the image side and a concave surface on the object side, which are arranged in the order from the object side. The fourth lens group G4 is composed of a biconvex lens L41 with a surface of an aspherical shape on the image side, and a cemented negative lens consisting of a biconvex lens L42 and a biconcave lens L43, which are arranged in the order from the object side. The fifth lens group G5 is composed of a positive meniscus lens L51 with a convex surface on the object side. Furthermore, the filter group FL is composed of a low-pass filter, an infrared cut filter, and so on. The aperture stop S is located in front of the third lens group G3 on the object side and moves together with the third lens group G3 during carrying out zooming from the wide-angle end state to the telephoto end state.

Table 9 below presents values of specifications of this third embodiment.

TABLE 9

|                | W       |   | IFL1    |   | IFL2    |   | T       |
|----------------|---------|---|---------|---|---------|---|---------|
| f =            | 10.51   | ~ | 29.59   | ~ | 70.00   | ~ | 107.09  |
| F. NO =        | 2.90    | ~ | 4.28    | ~ | 5.48    | ~ | 6.21    |
| 2ω =           | 80.72   | ~ | 30.99   | ~ | 13.45   | ~ | 8.88    |
| total length = | 85.72   | ~ | 100.79  | ~ | 122.26  | ~ | 131.98  |
| total height = | 8.50    | ~ | 8.50    | ~ | 8.50    | ~ | 8.50    |

| s   | r         | d      | n       | ν     |
|-----|-----------|--------|---------|-------|
| 1   | 66.8584   | 1.20   | 1.84666 | 23.78 |
| 2   | 43.3690   | 4.56   | 1.49700 | 81.54 |
| 3   | −250.2897 | 0.50   |         |       |
| 4   | 49.1404   | 2.64   | 1.64000 | 60.08 |
| 5   | 145.1012  | (d5)   |         |       |
| 6   | 574.1936  | 1.00   | 1.80139 | 45.45 |
| *7  | 11.8722   | 3.35   |         |       |
| 8   | −44.9700  | 0.85   | 1.77250 | 49.60 |
| 9   | 24.2316   | 0.10   |         |       |
| 10  | 20.8095   | 3.35   | 1.84666 | 23.78 |
| 11  | −28.2094  | 0.45   |         |       |
| 12  | −21.5065  | 0.85   | 1.74100 | 52.64 |
| 13  | 92.5972   | (d13)  |         |       |
| 14  | 0.0000    | 0.50   | (aperture stop S) | |
| 15  | 16.4245   | 2.44   | 1.60300 | 65.44 |
| 16  | −40.0579  | 0.11   |         |       |
| 17  | 20.3064   | 2.52   | 1.49700 | 81.54 |
| 18  | −20.4497  | 1.11   | 1.88300 | 40.76 |
| 19  | 31.8075   | 3.73   |         |       |
| 20  | −9.4576   | 1.00   | 1.80610 | 40.73 |
| *21 | −12.0696  | (d21)  |         |       |
| 22  | 19.2728   | 4.19   | 1.61881 | 63.85 |
| *23 | −23.7232  | 0.50   |         |       |
| 24  | 19.5475   | 3.29   | 1.60300 | 65.44 |
| 25  | −20.4929  | 1.33   | 1.77250 | 49.60 |
| 26  | 13.6192   | (d26)  |         |       |
| 27  | 28.8951   | 1.97   | 1.49700 | 81.54 |
| 28  | 53.6399   | (d28)  |         |       |
| 29  | 0.0000    | 1.00   | 1.51680 | 64.12 |
| 30  | 0.0000    | 1.50   |         |       |
| 31  | 0.0000    | 1.87   | 1.51680 | 64.12 |
| 32  | 0.0000    | 0.40   |         |       |
| 33  | 0.0000    | 0.70   | 1.51680 | 64.12 |
| 34  | 0.0000    | (Bf)   |         |       |

In this third embodiment, each lens surface of the seventh surface, the twenty first surface, and the twenty third surface is formed in an aspherical shape. Table 10 below provides data of the aspherical surfaces, i.e., values of the radius R of curvature at the top, the conic constant κ, and the aspheric constants A4-A10.

TABLE 10

| R | κ | A4 | A6 | A8 | A10 |
|---|---|---|---|---|---|
| [7th surface] | | | | | |
| 11.8722 | +1.3454 | −4.5438E−5 | −4.7295E−7 | +1.9516E−9 | −7.3608E−11 |
| [21st surface] | | | | | |
| −12.0696 | −0.4440 | −1.5896E−4 | −9.0688E−7 | −1.4501E−9 | −3.4217E−11 |
| [23rd surface] | | | | | |
| −23.7232 | +0.1515 | +1.2278E−4 | +1.9716E−7 | −6.5204E−9 | +4.3668E−11 |

In this third embodiment, the following spaces vary during carrying out zooming: the axial air space d5 between the first lens group G1 and the second lens group G2; the axial air space d13 between the second lens group G2 and the third lens group G3; the axial air space d21 between the third lens group G3 and the fourth lens group G4; the axial air space d26 between the fourth lens group G4 and the fifth lens group G5; the axial air space d28 between the fifth lens group G5 and the filter group FL; and the back focus Bf. Table 11 below presents variable spaces at each of focal lengths in the wide-angle end state, intermediate focal length state 1, intermediate focal length state 2, and the telephoto end state.

TABLE 11

|  | W | IFL1 | IFL2 | T |
|---|---|---|---|---|
| f | 10.5100 | 29.5924 | 70.0000 | 107.0900 |
| d5 | 1.3000 | 14.0480 | 28.1713 | 33.1027 |
| d13 | 20.5853 | 8.5728 | 3.7159 | 1.3000 |
| d21 | 4.5899 | 2.4367 | 1.3872 | 0.8000 |
| d26 | 3.1992 | 19.6830 | 32.9338 | 40.7260 |
| d28 | 8.5444 | 8.5444 | 8.5444 | 8.5444 |
| Bf | 0.5000 | 0.5000 | 0.5000 | 0.5000 |

Table 12 below presents values corresponding to the respective condition expressions in the third embodiment.

TABLE 12 fw = 10.5100
f1 = 66.0638
f2 = −10.6488
f3 = 38.9004
f4 = 24.9419
f5 = 122.7843
(1)f3/f4 = 1.5596
(2)f5/fw = 11.6826
(3)f3/f5 = 0.3168

Figure 9A:
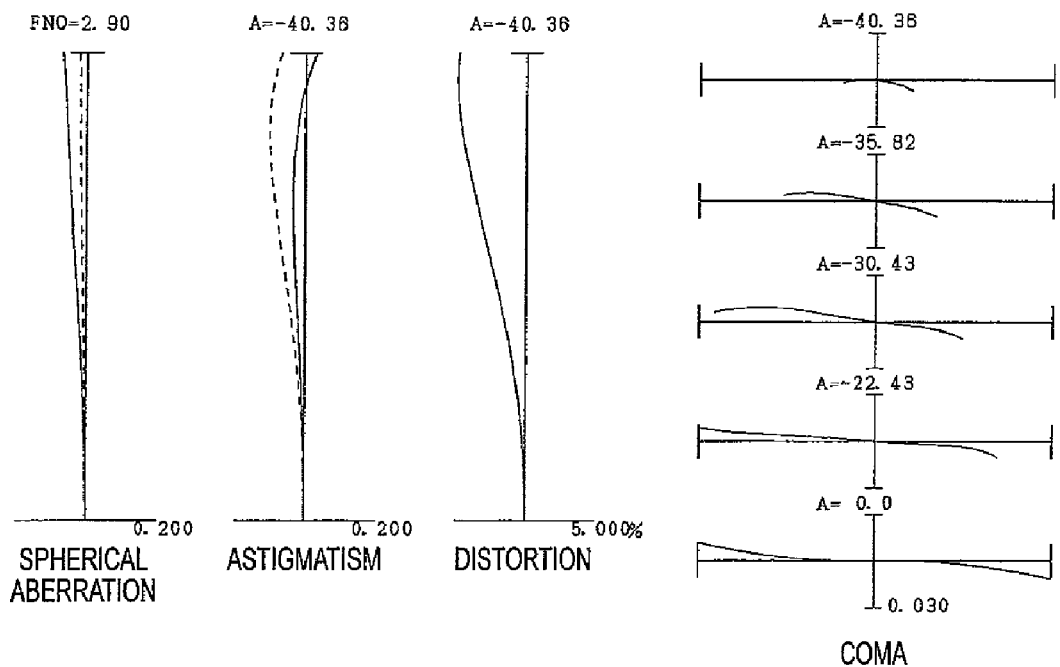
FIG. 9A is an aberration diagram showing aberrations in the infinity in-focus state in the wide-angle end state in the third embodiment.
Figure 9B:
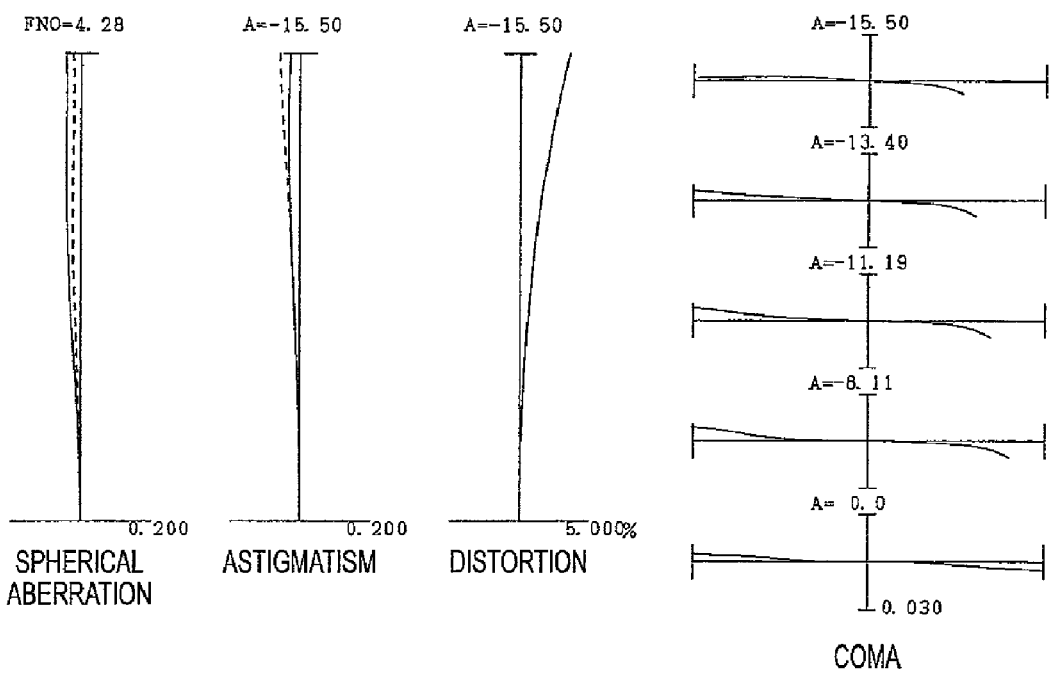
FIG. 9B is an aberration diagram showing aberrations in the infinity in-focus state in an intermediate focal length state 1 in the third embodiment.
Figure 10A:
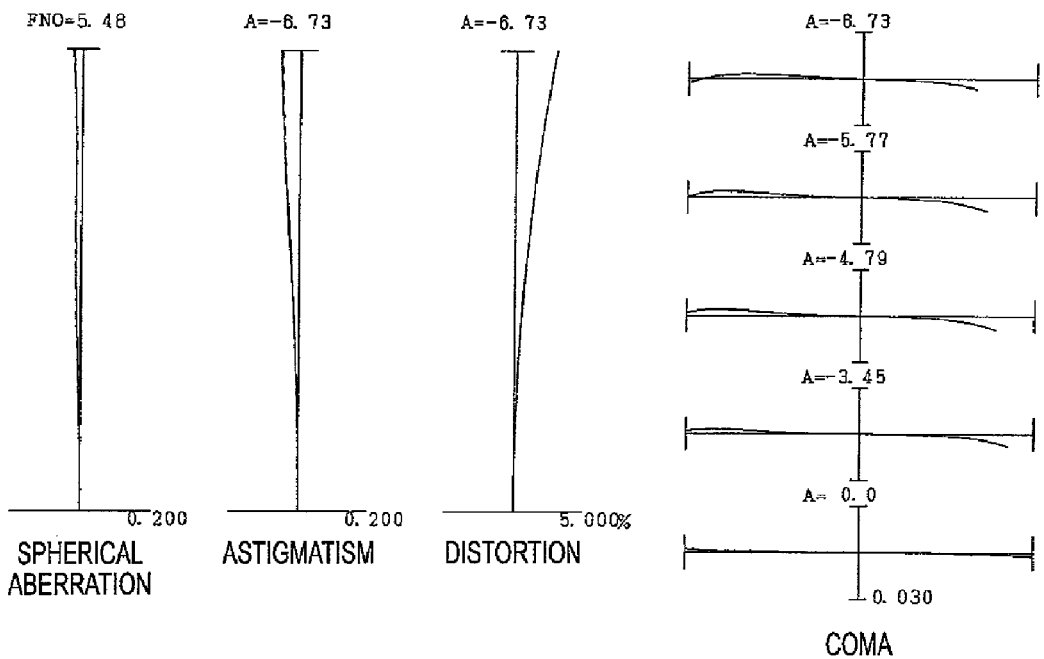
FIG. 10A is an aberration diagram showing aberrations in the infinity in-focus state in an intermediate focal length state 2 in the third embodiment.
Figure 10B:
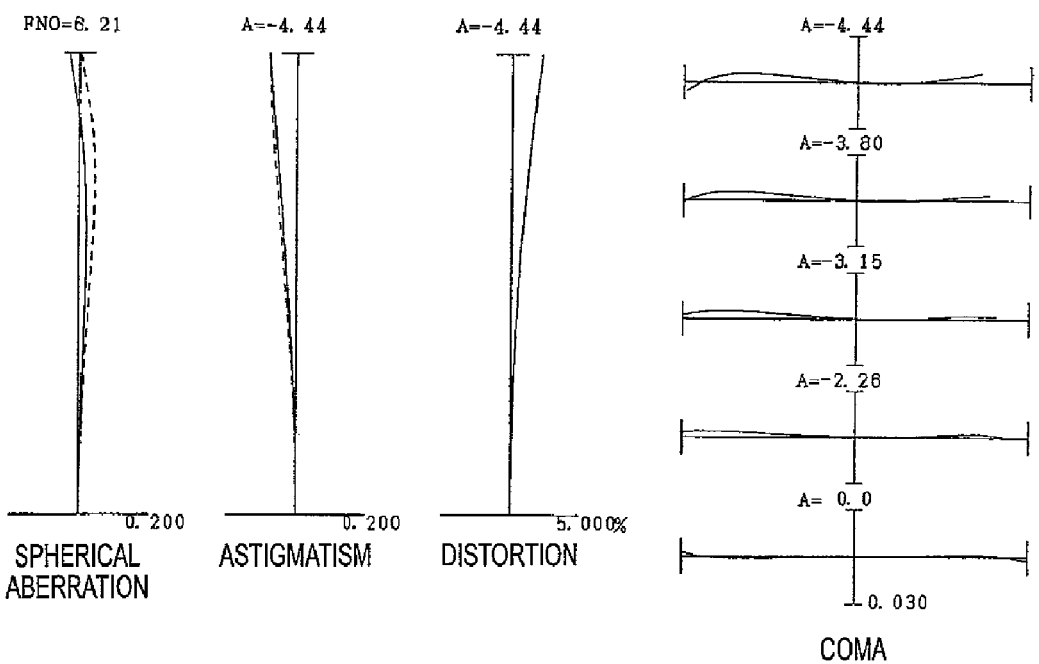
FIG. 10B is an aberration diagram showing aberrations in the infinity in-focus state in the telephoto end state in the third embodiment.

FIGS. 9A, 9B, 10A and 10B are aberration diagrams of aberrations in the third embodiment for the d line (λ=587.6 nm). Specifically, FIG. 9A is an aberration diagram of aberrations in the infinity in-focus state in the wide-angle end state (f=10.51 mm), FIG. 9B an aberration diagram of aberrations in the infinity in-focus state in the intermediate focal length state 1 (f=29.59 mm), FIG. 10A an aberration diagram of aberrations in the infinity in-focus state in the intermediate focal length state 2 (f=70.00 mm), and FIG. 10B an aberration diagram of aberrations in the infinity in-focus state in the telephoto end state (f=107.09 mm). It is apparent from the aberration diagrams that in the third embodiment the optical system is corrected well for the aberrations in each of the focal length states ranging from the wide-angle end state to the telephoto end state, and has excellent imaging performance.

Fourth Embodiment

Figure 11:
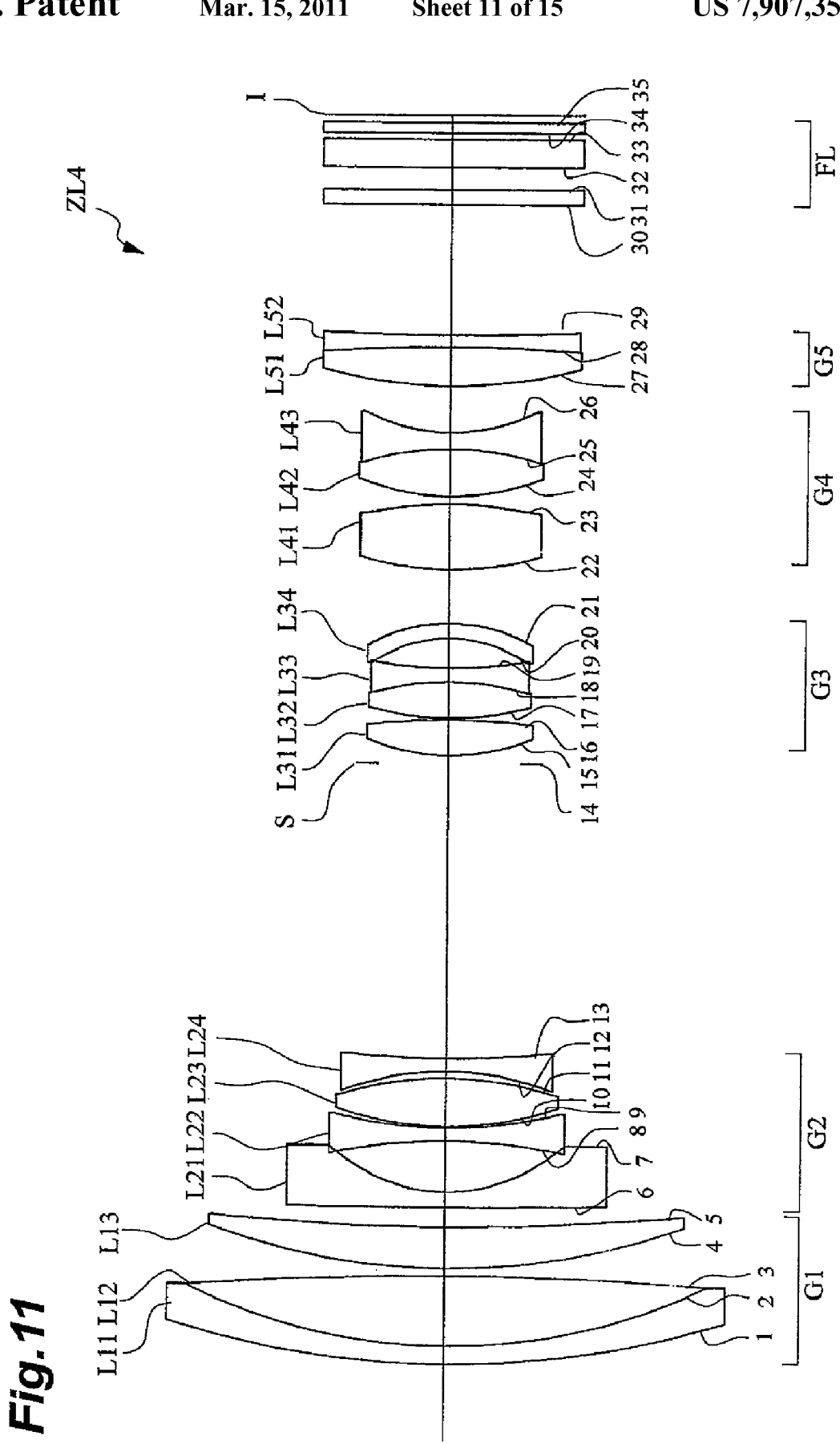
FIG. 11 is a sectional view showing a configuration of a zoom lens according to a fourth embodiment.

FIG. 11 is a drawing showing a configuration of a zoom lens ZL4 according to the fourth embodiment of the present invention. In this zoom lens ZL4 of FIG. 11, the first lens group G1 is composed of a cemented positive lens consisting of a negative meniscus lens L11 with a convex surface on the object side and a biconvex lens L12 cemented together, and a positive meniscus lens L13 with a convex surface on the object side, which are arranged in the order from the object side. The second lens group G2 is composed of a negative meniscus lens L21 with an aspherical surface on the image side and a convex surface on the object side, a biconcave lens L22, a biconvex lens L23, and a biconcave lens L24, which are arranged in the order from the object side. The third lens group G3 is composed of a biconvex lens L31, a cemented negative lens consisting of a biconvex lens L32 and a biconcave lens L33 cemented together, and a negative meniscus lens L34 with an aspherical surface on the image side and a concave surface on the object side, which are arranged in the order from the object side. The fourth lens group G4 is composed of a biconvex lens L41 with a surface of an aspherical shape on the image side and a cemented negative lens consisting of a biconvex lens L42 and a biconcave lens L43 cemented together, which are arranged in the order from the object side. The fifth lens group G5 is composed of a cemented positive lens consisting of a biconvex lens L51 and a biconcave lens L52 cemented together. Furthermore, the filter group FL is composed of a low-pass filter, an infrared cut filter, and so on. The aperture stop S is located in front of the third lens group G3 on the object side and moves together with the third lens group G3 during carrying out zooming from the wide-angle end state to the telephoto end state.

Table 13 below presents values of specifications of this fourth embodiment.

TABLE 13

|  | W |  | IFL1 |  | IFL2 |  | T |
|---|---|---|---|---|---|---|---|
| f = | 10.51 | ~ | 28.79 | ~ | 70.00 | ~ | 107.09 |
| F. NO = | 2.83 | ~ | 4.16 | ~ | 5.37 | ~ | 6.03 |
| 2ω = | 80.67 | ~ | 31.80 | ~ | 13.43 | ~ | 8.86 |
| total length = | 83.45 | ~ | 98.83 | ~ | 120.84 | ~ | 130.00 |
| total height = | 8.50 | ~ | 8.50 | ~ | 8.50 | ~ | 8.50 |

| s | r | d | n | ν |
|---|---|---|---|---|
| 1 | 66.6126 | 1.20 | 1.84666 | 23.78 |
| 2 | 42.5440 | 4.63 | 1.49700 | 81.54 |
| 3 | −268.3926 | 0.50 | | |
| 4 | 49.5954 | 2.74 | 1.64000 | 60.08 |
| 5 | 170.6326 | (d5) | | |
| 6 | 600.0000 | 1.00 | 1.80139 | 45.45 |
| *7 | 11.7888 | 3.39 | | |
| 8 | −40.3951 | 0.85 | 1.77250 | 49.60 |
| 9 | 31.6224 | 0.10 | | |

TABLE 13-continued

| | | | | |
|---|---|---|---|---|
| 10 | 24.0184 | 3.21 | 1.84666 | 23.78 |
| 11 | −26.3653 | 0.45 | | |
| 12 | −21.2517 | 0.85 | 1.74100 | 52.64 |
| 13 | 73.3661 | (d13) | | |
| 14 | 0.0000 | 0.50 | (aperture stop S) | |
| 15 | 14.9165 | 2.41 | 1.60300 | 65.44 |
| 16 | −50.6587 | 0.10 | | |
| 17 | 20.9125 | 2.46 | 1.49700 | 81.54 |
| 18 | −20.0423 | 0.95 | 1.88300 | 40.76 |
| 19 | 33.2683 | 2.00 | | |
| 20 | −9.5067 | 1.00 | 1.80139 | 45.45 |
| *21 | −12.3358 | (d21) | | |
| 22 | 22.5994 | 4.40 | 1.61881 | 63.85 |
| *23 | −22.5926 | 0.50 | | |
| 24 | 17.3056 | 3.16 | 1.60300 | 65.44 |
| 25 | −21.9465 | 1.13 | 1.75500 | 52.32 |
| 26 | 13.4028 | (d26) | | |
| 27 | 34.4762 | 2.61 | 1.51633 | 64.14 |
| 28 | −136.9234 | 0.80 | 1.80518 | 25.42 |
| 29 | 190.0000 | (d29) | | |
| 30 | 0.0000 | 1.00 | 1.51680 | 64.12 |
| 31 | 0.0000 | 1.50 | | |
| 32 | 0.0000 | 1.87 | 1.51680 | 64.12 |
| 33 | 0.0000 | 0.40 | | |
| 34 | 0.0000 | 0.70 | 1.51680 | 64.12 |
| 35 | 0.0000 | (Bf) | | |

In this fourth embodiment, each lens surface of the seventh surface, the twenty first surface, and the twenty third surface is formed in an aspherical shape. Table 14 below provides data of the aspherical surfaces, i.e., values of the radius R of curvature at the top, the conic constant κ, and the aspheric constants A4-A10.

TABLE 14

| R | κ | A4 | A6 | A8 | A10 |
|---|---|---|---|---|---|
| [7th surface] | | | | | |
| 11.7888 | +1.4479 | −5.2041E−5 | −7.0861E−7 | +5.5466E−9 | −1.3632E−10 |
| [21st surface] | | | | | |
| −12.3358 | −0.3989 | −1.6125E−4 | −1.1706E−6 | +4.1599E−9 | −1.1832E−10 |
| [23rd surface] | | | | | |
| −22.5926 | −0.2747 | +1.3239E−4 | +3.9614E−4 | −7.1779E−9 | +6.0866E−11 |

In this fourth embodiment, the following spaces vary during carrying out zooming: the axial air space d5 between the first lens group G1 and the second lens group G2; the axial air space d13 between the second lens group G2 and the third lens group G3; the axial air space d21 between the third lens group G3 and the fourth lens group G4; the axial air space d26 between the fourth lens group G4 and the fifth lens group G5; the axial air space d29 between the fifth lens group G5 and the filter group FL; and the back focus Bf. Table 15 below presents variable spaces at each of focal lengths in the wide-angle end state, intermediate focal length state 1, intermediate focal length state 2, and the telephoto end state.

TABLE 15

| | W | IFL1 | IFL2 | T |
|---|---|---|---|---|
| f | 10.5100 | 28.7853 | 69.9999 | 107.0898 |
| d5 | 1.3000 | 13.5955 | 27.8552 | 32.8505 |
| d13 | 19.8587 | 8.6755 | 3.7209 | 1.3000 |
| d21 | 3.6014 | 1.9607 | 1.0346 | 0.5000 |
| d26 | 3.0946 | 19.0020 | 32.6360 | 39.7524 |
| d29 | 8.6804 | 8.6804 | 8.6804 | 8.6804 |
| Bf | 0.5000 | 0.4999 | 0.4999 | 0.4998 |

Table 16 below presents values corresponding to the respective condition expressions in the fourth embodiment.

TABLE 16 fw = 10.5100
f1 = 64.9007
f2 = −10.5228
f3 = 40.8718
f4 = 24.6784
f5 = 113.4213
(1)f3/f4 = 1.6562
(2)f5/fw = 10.7918
(3)f3/f5 = 0.3604

Figure 12A:
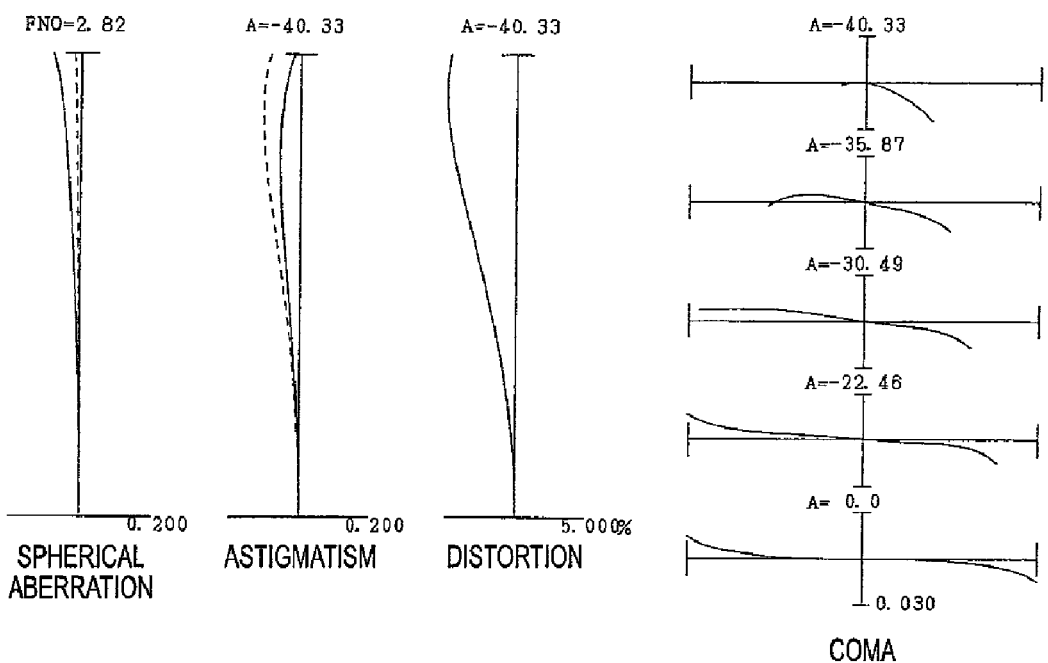
FIG. 12A is an aberration diagram showing aberrations in the infinity in-focus state in the wide-angle end state in the fourth embodiment.
Figure 12B:
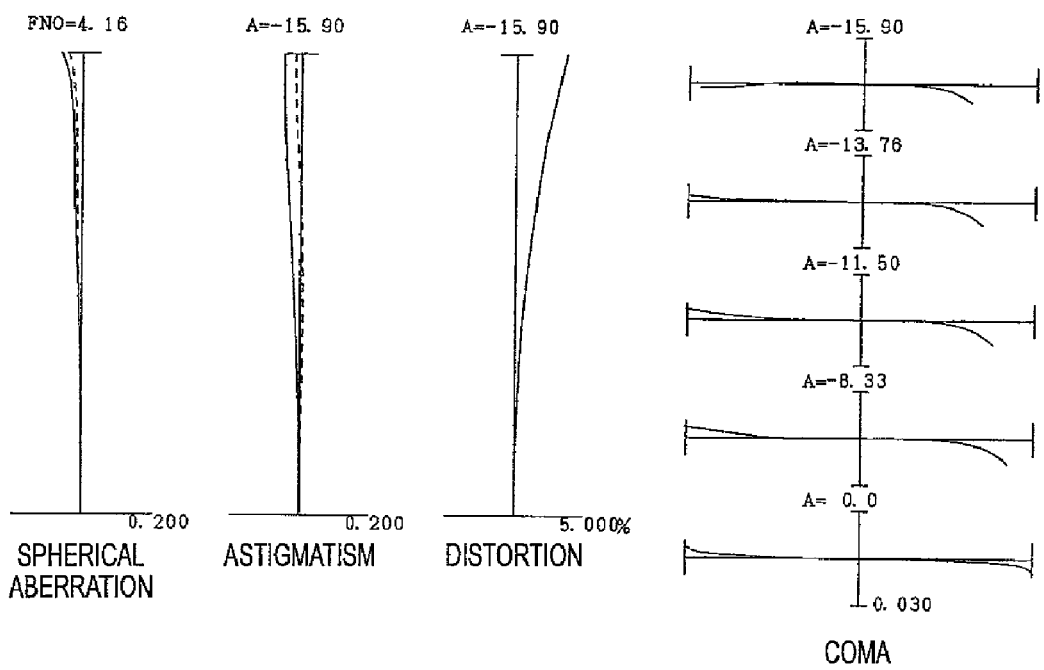
FIG. 12B is an aberration diagram showing aberrations in the infinity in-focus state in an intermediate focal length state 1 in the fourth embodiment.
Figure 13A:
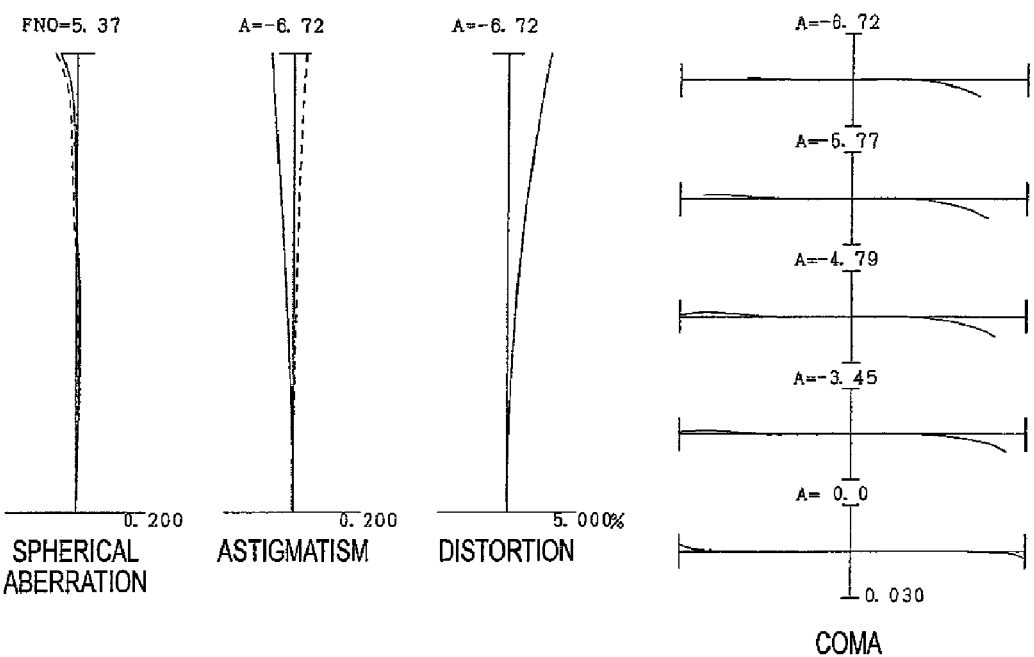
FIG. 13A is an aberration diagram showing aberrations in the infinity in-focus state in an intermediate focal length state 2 in the fourth embodiment.
Figure 13B:
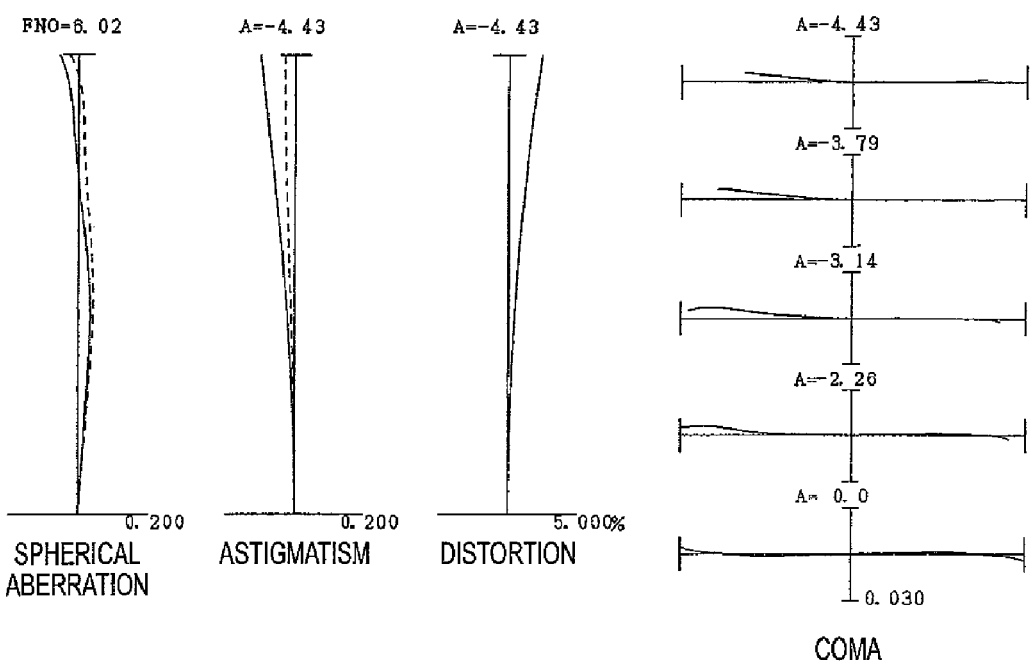
FIG. 13B is an aberration diagram showing aberrations in the infinity in-focus state in the telephoto end state in the fourth embodiment.

FIGS. 12A, 12B, 13A and 13B are aberration diagrams of aberrations in the fourth embodiment for the d line (λ=587.6 nm). Specifically, FIG. 12A is an aberration diagram of aberrations in the infinity in-focus state in the wide-angle end state (f=10.51 mm), FIG. 12B an aberration diagram of aberrations in the infinity in-focus state in the intermediate focal length state 1 (f=28.79 mm), FIG. 13A an aberration diagram of aberrations in the infinity in-focus state in the intermediate focal length state 2 (f=70.00 mm), and FIG. 13B an aberration diagram of aberrations in the infinity in-focus state in the telephoto end state (f=107.09 mm). It is apparent from the aberration diagrams that in the fourth embodiment the optical system is corrected well for the aberrations in each of the focal length states ranging from the wide-angle end state to the telephoto end state, and has excellent imaging performance.

The embodiments can be used in an optical apparatus such as a digital still camera and, more particularly, to a zoom lens of a high zoom ratio. When the zoom lens and the optical apparatus with the zoom lens according to the embodiments of the present invention are configured as described above, it becomes feasible to realize the zoom lens with excellent imaging performance of a high zoom ratio, as a zoom lens suitable for camcorders, digital still cameras, etc. using solid-state image sensors or the like.

In the optical systems (zoom lenses) of the embodiments, the smallest axial distance from the image-side surface of the lens component located nearest the image side, to the image plane (the back focus) is preferably in the range of about 10 mm to 30 mm. In the optical systems (zoom lenses) of the embodiments, the image height is preferably in the range of 5 mm to 12.5 mm and more preferably in the range of 5 mm to 9.5 mm.

The above embodiments concern the five-group configuration, but the above configuration, conditions, etc. are also applicable to other group configurations, e.g., a six-group configuration. For example, it is also possible to add another lens or lens group closest to the object, or to add another lens or lens group closest to the image. A lens group refers to a portion having at least one lens, which is separated by an air space varying during carrying out zooming. A lens group refers to a portion having at least one lens, which is separated by an air space varying during carrying out zooming.

In the optical systems (zoom lenses) of the embodiments, a single lens group or two or more lens groups, or a partial lens group may be configured to move in the direction of the optical axis, as a focusing lens group which implements focusing from an infinite object to a close object. In this case, the focusing lens group is also applicable to autofocus and is also suitable for motor driving using an ultrasonic motor for autofocus or the like. Particularly, at least a part of the fourth lens group is preferably constructed as the focusing lens.

A lens group or a partial lens group may be configured as an antivibration lens group that compensates for image blurring caused by hand shakes, by moving the lens group so as to have a component in the direction perpendicular to the optical axis, or by rotationally moving (or swinging) the lens group around a certain point on the optical axis. Particularly, it is preferable to construct at least a part of the second lens group, a part of the third lens group, or a part of the fourth lens group as the antivibration lens group.

A lens surface may be constructed of a spherical surface or a plane, or may be constructed of an aspherical surface. A lens surface of a spherical surface or a plane is preferable because it becomes easier to perform lens processing and assembly adjustment and it prevents degradation of optical performance due to errors in processing and assembly adjustment. In addition, it is preferable because degradation of description performance is less even with deviation of the image plane. When a lens surface is an aspherical surface on the other hand, the aspherical surface may be any one of an aspherical surface made by grinding, a glass mold aspherical surface molded in an aspherical shape of glass with a mold, and a composite aspherical surface made in an aspherical shape of a resin on a surface of glass. A lens surface may be a diffractive surface and a lens may be a gradient index lens (GRIN lens) or a plastic lens.

The aperture stop is preferably located near or in the third lens group, but a lens frame may be configured to serve as the aperture stop, without provision of any member as an aperture stop.

Each lens surface may be provided with an antireflection film having high transmittance in a wide wavelength range, in order to achieve high-contrast optical performance while reducing flares and ghosts.

The zoom lenses (zooming optical systems) of the embodiments have the zoom ratio of about 5× to 15×.

In the zoom lenses (zooming optical systems) of the embodiments, the first lens group preferably has two positive lens components. It is also preferable to arrange the lens components in positive and positive order from the object side, with intervention of an air space. Or, the first lens group preferably has two positive lens components and one negative lens component. It is also preferable to arrange the lens components in negative, positive and positive order from the object side, with intervention of an air space. In the zoom lenses (zooming optical systems) of the embodiments, the second lens group preferably has one positive lens component and three negative lens components. It is also preferable to arrange the lens components in negative, negative, positive and negative order from the object side, with intervention of an air space. Or, the second lens group preferably has one positive lens component and two negative lens components. It is also preferable to arrange the lens components in negative, positive and negative order from the object side, with intervention of an air space. In the zoom lenses (zooming optical systems) of the embodiments, the third lens group preferably has two positive lens components and one negative lens component. It is also preferable to arrange the lens components in positive, positive and negative order from the object side, with intervention of an air space. Or, the third lens group preferably has one positive lens component and two negative lens components. It is also preferable to arrange the lens components in positive, negative and positive order from the object side, with intervention of an air space. In the zoom lenses (zooming optical systems) of the embodiments, the fourth lens group preferably has one positive lens component and one negative lens component. It is also preferable to arrange the lens components in positive and negative order from the object side, with intervention of an air space. Or, the fourth lens group preferably has two positive lens components and one negative lens component. It is also preferable to arrange the lens components in positive, positive and negative order from the object side, with intervention of an air space. In the zoom lenses (zooming optical systems) of the embodiments, the fifth lens group preferably has one positive lens component. It is also preferable to arrange the lens components in positive order from the object side, with intervention of an air space. Or, the fifth lens group preferably has one positive lens component and one negative lens component. It is also preferable to arrange the lens components in positive and negative order from the object side, with intervention of an air space.

The invention is not limited to the foregoing embodiments but various changes and modifications of its components may be made without departing from the scope of the present invention. Also, the components disclosed in the embodiments may be assembled in any combination for embodying the present invention. For example, some of the components may be omitted from all components disclosed in the embodiments. Further, components in different embodiments may be appropriately combined.

What is claimed is:

1. A zoom lens comprising the following lens groups in order from an object side:
 a first lens group having a positive refracting power;
 a second lens group having a negative refracting power;
 a third lens group having a positive refracting power; and
 a fourth lens group having a positive refracting power;
 wherein, upon zooming, at least the first lens group and the fourth lens group move to the object side;
 wherein the third lens group comprises a negative meniscus lens with a convex surface on an image side and with both side faces thereof being exposed to air, the negative meniscus lens being located nearest to the image side in the third lens group;
 wherein at least one surface in the third lens group is an aspherical surface;
 wherein the zoom lens satisfies the condition of the following relation:

$$1.30 < f3/f4 < 1.85,$$

where f3 is a focal length of the third lens group and f4 is a focal length of the fourth lens group; and
 wherein the third lens group further comprises, in order from the object side:
 a positive lens with a convex surface on the object side; and
 a cemented lens consisting of a positive lens with a convex surface on the object side and a negative lens with a concave surface on the image side.

2. The zoom lens according to claim 1, wherein the negative meniscus lens is a single lens.

3. The zoom lens according to claim 1, wherein, upon zooming, at least the first lens group and the fourth lens group move to the object side to vary a space between the first lens group and the second lens group, vary a space between the second lens group and the third lens group, and vary a space between the third lens group and the fourth lens group.

4. The zoom lens according to claim 1, wherein, upon zooming, a space between the first lens group and the second lens group increases, a space between the second lens group and the third lens group decreases, and a space between the third lens group and the fourth lens group decreases.

5. The zoom lens according to claim 1, further comprising an aperture stop between the second lens group and the third lens group, wherein, upon zooming, the aperture stop moves together with the third lens group.

6. The zoom lens according to claim 1, wherein the cemented lens has a negative refracting power.

7. A zoom lens comprising the following lens groups in order from an object side:
   a first lens group having a positive refracting power;
   a second lens group having a negative refracting power;
   a third lens group having a positive refracting power; and
   a fourth lens group having a positive refracting power;
   wherein, upon zooming, at least the first lens group and the fourth lens group move to the object side;
   wherein the third lens group comprises a negative meniscus lens with a convex surface on an image side and with both side faces thereof being exposed to air, the negative meniscus lens being located nearest to the image side in the third lens group, and a cemented lens consisting of a positive lens with a convex surface on the object side and a negative lens with a concave surface on the image side; and
   wherein the zoom lens satisfies the condition of the following relation:

$1.30 < f3/f4 < 1.85$, where f3 is a focal length of the third lens group and f4 is a focal length of the fourth lens group.

8. A zoom lens comprising the following lens groups in order from an object side:
   a first lens group having a positive refracting power;
   a second lens group having a negative refracting power;
   a third lens group having a positive refracting power; and
   a fourth lens group having a positive refracting power;
   wherein, upon zooming, at least the first lens group and the fourth lens group move to the object side;
   wherein the third lens group comprises a negative meniscus lens with a convex surface on an image side and with both side faces thereof being exposed to air, the negative meniscus lens being located nearest to the image side in the third lens group, and a cemented lens consisting of a positive lens with a convex surface on the object side and a negative leans with a concave surface on the image side; and
   wherein the zoom lens further comprises a fifth lens group having a positive refracting power on the image side of the fourth lens group.

9. The zoom lens according to claim 8, wherein the fifth lens group is stationary with respect to an image plane upon zooming.

10. The zoom lens according to claim 8, wherein the fifth lens group is moved to the object side to adjust focus to a close object.

11. The zoom lens according to claim 8, which satisfies the condition of the following relation:

$4.7 < f5/fw < 15.1$, where fw is a focal length of the entire lens system in the wide-angle end state and f5 is a focal length of the fifth lens group.

12. The zoom lens according to claim 8, wherein the fifth lens group is composed of a single lens component.

13. The zoom lens according to claim 12, wherein the fifth lens group is composed of a cemented lens consisting of a positive lens and a negative lens.

14. The zoom lens according to claim 8, which satisfies the condition of the following relation:

$0.19 < f3/f5 < 0.56$, where f3 is a focal length of the third lens group and f5 is a focal length of the fifth lens group.

15. An optical apparatus comprising the zoom lens as set forth in claim 1, which forms an image of an object on a predetermined image plane.

16. A method for forming an image of an object and varying a focal length, comprising the steps of:
    providing a zoom lens that includes the following lens groups in order from the object side, a first lens group having a positive refracting power, a second lens group having a negative refracting power, a third lens group having a positive refracting power, and a fourth lens group having a positive refracting power,
    the third lens group comprising a negative meniscus lens with a convex surface on an image side and with the both side faces thereof being exposed to air, the negative meniscus lens being located nearest to the image side in the third lens group,
    at least one surface in the third lens group being an aspherical surface, and
    the condition of the following relation being satisfied:

$1.30 < f3/f4 < 1.85$, where f3 is a focal length of the third lens group and f4 is a focal length of the fourth lens group; and
    moving at least the first lens group and the fourth lens group to the object side, upon zooming.

17. The method according to claim 16, wherein the third lens group further comprises, in order from the object side:
    a positive lens with a convex surface on the object side; and
    a cemented lens consisting of a positive lens with a convex surface on the object side and a negative lens with a concave surface on the image side.

18. The method according to claim 16, wherein the third lens group further comprises a cemented lens consisting of a positive lens with a convex surface on the object side and a negative lens with a concave surface on the image side.

19. A method for forming an image of an object and varying a focal length, comprising the steps of:
    providing a zoom lens that includes the following lens groups in order from the object side, a first lens group having a positive refracting power, a second lens group having a negative refracting power, a third lens group having a positive refracting power, and a fourth lens group having a positive refracting power,
    the third lens group comprising a negative meniscus lens with a convex surface on an image side and with both side faces thereof being exposed to air, the negative meniscus lens being located nearest to the image side in the third lens group, and a cemented lens consisting of a positive lens with a convex surface on the object side and a negative lens with a concave surface on the image side, and
    the condition of the following relation being satisfied:

$1.30 < f3/f4 < 1.85$, where f3 is a focal length of the third lens group and f4 is a focal length of the fourth lens group; and moving at least the first lens group and the fourth lens group to the object side, upon zooming.

20. A method for forming an image of an object and varying a focal length, comprising the steps of:

providing a zoom lens that includes the following lens groups in order from the object side, a first lens group having a positive refracting power, a second lens group having a negative refracting power, a third lens group having a positive refracting power, and a fourth lens group having a positive refracting power, the third lens group comprising a negative meniscus lens with a convex surface on an image side and with both side faces thereof being exposed to air, the negative meniscus lens being located nearest to the image side, and a cemented lens consisting of a positive lens with a convex surface on the object side and a negative lens with a concave surface on the image side, the zoom lens further comprising a fifth lens group having a positive refracting power on the image side of the fourth lens group; and moving at least the first lens group and the fourth lens group to the object side, upon zooming.

21. The method according to claim 20, wherein the fifth lens group is moved to the object side to adjust focus to a close object.

22. A zoom lens comprising the following lens groups in order from an object side:

a first lens group having a positive refracting power;
a second lens group having a negative refracting power;
a third lens group having a positive refracting power; and
a fourth lens group having a positive refracting power;

wherein, upon zooming, at least the first lens group and the fourth lens group move to the object side;

wherein the third lens group comprises a negative meniscus lens with a convex surface on an image side and with both side faces thereof being exposed to air, the negative meniscus lens being located nearest to the image side in the third lens group;

wherein at least one surface in the third lens group is an aspherical surface;

wherein the zoom lens satisfies the condition of the following relation:

$$1.30 < f3/f4 < 1.85,$$

where f3 is a focal length of the third lens group and f4 is a focal length of the fourth lens group; and wherein the third lens group further comprises a cemented lens having a negative refracting power, the cemented lens consisting of a positive lens with a convex surface on the object side and a negative lens with a concave surface on the image side.

* * * * *